United States Patent
Nishimura et al.

(10) Patent No.: US 9,099,745 B2
(45) Date of Patent: *Aug. 4, 2015

(54) GRAPHITE CARBON COMPOSITE MATERIAL, CARBON MATERIAL FOR BATTERY ELECTRODES, AND BATTERIES

(75) Inventors: Yoshiyuki Nishimura, Tokyo (JP); Akinori Sudoh, Tokyo (JP); Shunsuke Yoshioka, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/000,329

(22) PCT Filed: Apr. 20, 2012

(86) PCT No.: PCT/JP2012/060761
§ 371 (c)(1),
(2), (4) Date: Aug. 19, 2013

(87) PCT Pub. No.: WO2012/144618
PCT Pub. Date: Oct. 26, 2012

(65) Prior Publication Data
US 2013/0323601 A1 Dec. 5, 2013

(30) Foreign Application Priority Data
Apr. 21, 2011 (JP) ................. 2011-095087

(51) Int. Cl.
*H01M 4/583* (2010.01)
*H01M 4/587* (2010.01)
(Continued)

(52) U.S. Cl.
CPC .............. *H01M 4/587* (2013.01); *H01M 4/364* (2013.01); *H01M 4/366* (2013.01); *H01M 4/625* (2013.01); *H01M 10/0525* (2013.01); *Y02T 10/7011* (2013.01)

(58) Field of Classification Search
CPC ...... H01M 4/587; H01M 4/583; H01M 4/625
USPC ....................................... 429/231.8
See application file for complete search history.

(56) References Cited

U.S. PATENT DOCUMENTS 6,241,957 B1   6/2001  Stiller et al.
8,372,373 B2 *  2/2013  Nishimura et al. ........... 423/448
(Continued)

FOREIGN PATENT DOCUMENTS

EP   2418172 A1   2/2012
EP   2602851 A1   6/2013
(Continued)

OTHER PUBLICATIONS

Communication dated Oct. 15, 2014, issued by the European Patent Office in counterpart Application No. 12773955.5.
(Continued)

*Primary Examiner* — Patrick Ryan
*Assistant Examiner* — Lucas J O'Donnell
(74) *Attorney, Agent, or Firm* — Sughrue Mion, PLLC

(57) ABSTRACT

A graphite carbon composite material including a graphite material having diversity in the sizes of optical anisotropic structure and optical isotropic structure, the ratio thereof, and crystal direction, and a carbon material on the way to a graphitized structure of easily-graphitizable carbon. Also disclosed is a carbon material for a battery electrode, a past for an electrode, an electrode, a battery, a lithium ion secondary battery and a method of producing the graphite carbon composite material.

18 Claims, 4 Drawing Sheets

(51) Int. Cl.
*H01M 4/36* (2006.01)
*H01M 10/0525* (2010.01)
*H01M 4/62* (2006.01)

(56) References Cited

U.S. PATENT DOCUMENTS

2006/0133980 A1* 6/2006 Nanba et al. ............. 423/445 R
2009/0098448 A1  4/2009 Ozaki et al.
2009/0242849 A1  10/2009 Sudoh et al.
2010/0086856 A1* 4/2010 Matsumoto et al. ....... 429/231.8

FOREIGN PATENT DOCUMENTS

| | | |
|---|---|---|
| JP | 04-190555 A | 7/1992 |
| JP | 07-320740 A | 12/1995 |
| JP | 10-095982 A | 4/1998 |
| JP | 3361510 B2 | 1/2003 |
| JP | 2004-507426 A | 3/2004 |
| JP | 3534391 B2 | 6/2004 |
| JP | 2006-140138 A | 6/2006 |
| JP | 2006-312578 A | 11/2006 |
| JP | 2007-172901 A | 7/2007 |
| WO | 2006/022100 A1 | 3/2006 |
| WO | 2008/047768 A1 | 4/2008 |

OTHER PUBLICATIONS

International Search Report of PCT/JP2012/060761 dated May 29, 2012.

* cited by examiner

GRAPHITE CARBON COMPOSITE MATERIAL, CARBON MATERIAL FOR BATTERY ELECTRODES, AND BATTERIES

CROSS REFERENCE TO RELATED APPLICATIONS

This is a National Stage of International Application No. PCT/JP2012/060761 filed Apr. 20, 2012, claiming priority based on Japanese Patent Application No. 2011-095087 filed Apr. 21, 2011, the contents of all of which are incorporated herein by reference in their entirety.

TECHNICAL FIELD

The present invention relates to a graphite carbon composite material, a carbon material for a battery electrode, and a battery. More specifically, the present invention relates to a graphite carbon composite material and a carbon material for a battery electrode, which are suitable as electrode materials for a non-aqueous electrolytic solution secondary battery, and also relates to a secondary battery excellent in charge/discharge cycle characteristics and large current load characteristics.

BACKGROUND ART

As a power source of a mobile device, or the like, a lithium ion secondary battery is mainly used. The function of the mobile device or the like is diversified, resulting in increasing in power consumption thereof. Therefore, a lithium ion secondary battery is required to have an increased battery capacity and, simultaneously, to have an enhanced charge/discharge cycle characteristic. Further, there is an increasing demand for a secondary battery with a high output and a large capacity for electric tools such as an electric drill and a hybrid automobile. In this field, conventionally, a lead secondary battery, a nickel-cadmium secondary battery, and a nickel-hydrogen secondary battery are mainly used. A small and light lithium ion secondary battery with high energy density is highly expected, and there is a demand for a lithium ion secondary battery excellent in large current load characteristics.

In particular, in applications for automobiles, such as battery electric vehicles (BEV) and hybrid electric vehicles (HEV), a long-term cycle characteristic over 10 years and a large current load characteristic for driving a high-power motor are mainly required, and a high volume energy density is also required for extending a driving range, which are severe as compared to mobile applications.

In the lithium ion secondary battery, generally, a lithium salt, such as lithium cobaltate, is used as a positive electrode active material, and a carboneous material, such as graphite, is used as a negative electrode active material.

Graphite is classified into natural graphite and artificial graphite. Among those, natural graphite is available at a low cost. However, as natural graphite has a scale shape, if natural graphite is formed into a paste together with a binder and applied to a collector, natural graphite is aligned in one direction. When an electrode made of such a material is charged, the electrode expands only in one direction, which degrades the performance of the electrode. Natural graphite, which has been granulated and formed into a spherical shape, is proposed, however, the resulting spherical natural graphite is aligned because of being crushed by pressing in the course of electrode production. Further, the surface of the natural graphite is active, and hence a large amount of gas is generated during initial charging, which decreases an initial efficiency and degrades a cycle characteristic. In order to solve those problems, Japanese Patent publication No. 3534391 (U.S. Pat. No. 6,632,569, Patent Document 1), etc. propose a method involving coating artificial carbon on the surface of the natural graphite processed into a spherical shape. The material produced by this method can address a high-capacity, a low-current, and an intermediate-cycle characteristic required by the mobile applications, etc. However, it is very difficult for the material to satisfy the requests such as a large current and an ultralong-term cycle characteristic of a large battery as described above.

On the other hand, regarding artificial graphite, first, there is exemplified a mesocarbon microsphere-graphitized article described in JP 04-190555 A (Patent Document 2). This is a well-balanced negative electrode material, and is capable of producing a battery with a high capacity and a large current. However, it is difficult to achieve the cycle characteristic for a much longer period of time than the one for mobile applications, which are required for a large battery.

Artificial graphite typified by graphitized articles, such as oil, coal pitch, and coke, is available at a relatively low cost. However, a satisfactory crystalline needle-shaped coke tends to align in a scale shape. In order to solve this problem, the method described in Japanese patent publication No. 3361510 (Patent Document 3) and the like yield results. This method can allow the use of not only fine powder of an artificial graphite material but also fine powder of a natural graphite, or the like, and exhibits very excellent performance for a negative electrode material for the mobile applications. This material can address the high-capacity, the low-current, and the intermediate cycle characteristic required for the mobile applications, etc. However, this material has not satisfied requests such as a large current and an ultralong-term cycle characteristic of a large battery as described above.

Further, negative electrode materials using so-called hard carbon and amorphous carbon described in JP 07-320740 A (U.S. Pat. No. 5,587,255, Patent Document 4) are excellent in a characteristic with respect to a large current and also have a relatively satisfactory cycle characteristic. However, the volume energy density of each of such negative electrode materials is too low and the price thereof is very expensive, and thus, such negative electrode materials are only used for some special large batteries.

On the other hand, though it has not attracted much attention to date, a carbon material obtained by the heat treatment at 1,600 to 2,300° C. of so-called easily-graphitizable carbon has a discharge capacity of about 250 mAh/g. Though it is much lower than a theoretical capacity of 372 mAh/g, the carbon material has an internal structure between a high cristallinity structure and a turbostratic structure: i.e. a structure on the way to a graphitized structure, and is known to have very excellent large current-input/output characteristics and cycle characteristics owing to the structure. However, it is almost impossible to improve a discharge capacity while maintaining large current-input/output characteristics. Also, when the material is mixed with natural graphite and the like having a high discharge capacity, it results in great decrease in the large current-input/output characteristics and a problem that it becomes impossible to keep the desired performance.

PRIOR ART DOCUMENT

Patent Document

[Patent Document 1] JP 3534391 B2
[Patent Document 2] JP 04-190555 A

[Patent Document 3] JP 3361510 B2
[Patent Document 4] JP 07-320740 A
[Patent Document 5] JP 2006-140138 A

DISCLOSURE OF THE INVENTION

The present inventors have sought a carbon material, which can improve a discharge capacity by being added to the above-mentioned carbon material on the way to a graphitized structure obtained by subjecting easily-graphitized carbon to heat treatment at 1,600 to 2,300° C. without greatly impairing good large current-input/output characteristics inherent to the above-mentioned carbon material. First, the present inventors focused on an internal structure of each particle of the graphite material. More specifically, targeting a particle comprising a complex of a domain having an arranged graphite network to be an important factor of high energy density and a domain of hard carbon excellent in the high current load characteristics and cycle characteristics, the inventors of the present invention studied in detail the sizes, ratio, alignment directions of the above-mentioned two kinds of domains; and the effect and the like of the other structure such as voids.

For example, JP 2002-124255 A and JP 2000-149946 A each adopt a graphite material having a mosaic structure, in which a material mesophase pitch is polymerized by heating while being flowed on the surface of a particulate or powdery mesophase pitch heat treatment article (compensation medium), the mesophase pitch is solidified while receiving a shearing force caused by flowing, and thus, a mosaic structure is formed. However, in the case of a polymerization reaction without performing cross-linking treatment such as use of nitric acid, an optical anisotropic structure continues to grow. Therefore, the mosaic structure itself becomes large by the above-mentioned polymerization method.

It is conventionally known that, in a structure of a carbon-related material, a domain in which crystal grows and a graphite network is arranged exhibits optical anisotropy, and a material in which crystal does not develop completely or a material such as hard carbon in which crystal is largely disturbed exhibits optical isotropy. This can be determined by a polarizing microscope observation method described in, for example, "Modern Carbon Material Experimental Technology (Analysis part) edited by The Carbon Society of Japan (2001), published by Sipec Corporation, pages 1-8".

With use of the observation method, in particular, interference color can be sensitized via a sensitized color test plate in which crystal of transparent plaster or muscovite that is a birefringent material is applied to a glass plate in a predetermined direction. That is, regarding the domain exhibiting optical anisotropy, red color of 530 nm is exhibited with a phase delay due to the sensitized color test plate with a predetermined thickness in a crossed-Nicols state at a time of polarizing microscope image observation. In this system, even if the phase delay is increased or decreased slightly, interference color changes acutely. That is, when a subject is rotated at a time of entirely red color in crossed-Nicols, an isotropic part retains red color, however, if the wavelength increases slightly, the isotropic part changes from purple color to blue color. On the contrary, when the wavelength decreases, the isotropic part changes from orange color to yellow color. Thus, when an optical anisotropic domain is rotated from 0° to 45°, interference color changes to yellow, magenta, blue, etc. depending upon the arrangement direction of a graphite network. Therefore, the arrangement direction of the domain can also be determined easily.

Using the polarizing microscope observation method as a method for analyzing the organization structure, the inventors of the present invention studied earnestly various carbon materials by the above-mentioned method. As a result, the present inventors found that graphite material having a particular internal structure shown below have an excellent high energy density, a long cycle characteristics, and a high current load characteristics at a high level in a well-balanced manner, which cannot be found in the conventional carbon materials for a negative electrode for a lithium ion secondary battery. Further, the inventors of the present invention found a method of producing a carbon material having this internal structure from a material for coke and achieved the present invention with a possible solution to an economic problem. By mixing the graphite material into the above-mentioned carbon material on the way to a graphitized structure, a discharge capacity can be improved without impairing the excellent large current-input/output characteristics inherent to the above-mentioned carbon material.

[1] A graphite carbon composite material obtained by mixing a graphite material comprising graphite particles each formed of an optical anisotropic structure, an optical isotropic structure and voids and satisfying the following conditions (1) and (2):

(1) when ten square regions with a side of 100 μm are randomly selected from a cross-section of a molding made of the graphite material, in cross-sections of the graphite particles appearing in the regions, a total area (x) of the optical anisotropic structure, a total area (y) of the optical isotropic structure, and a total area (z) of the voids satisfy the following relationship:

$$x:y:z=50\text{-}97:3\text{-}50:0\text{-}10, \text{ and } x+y+z=100$$

(2) in cross-sections of the randomly selected 100 particles, a maximum value of a length of a long-side portion of optical anisotropic structure domains is defined as $L_{max}$ and an average particle diameter (D50) based on a volume measured by laser diffraction method is defined as $L_{ave}$, $L_{max}/L_{ave} \leq 0.5$;

and a carbon material on the way to a graphitized structure of easily-graphitizable carbon.

[2] The graphite carbon composite material according to [1] above, in which, when ten square regions with a side of 100 μm are randomly selected from the cross-section of the molding made of the graphite material, cross-sections of the graphite particles appearing in the regions satisfy the following condition with respect to the graphite material:

$$0.75 \leq Db(99.5)/Da(100) \leq 0.995$$

(in the above-mentioned expression: Da(n1) represents an area value (μm²) of a maximum domain when areas of the optical anisotropic structure domains are integrated in an ascending order and a total of the integrated values reaches n1% of a total (A) of areas (μm²) of the optical anisotropic structure domains, and Db(n2) represents an area value (μm²) of a maximum domain when the optical anisotropic structure domains are arranged in an ascending order of areas, and a total of the number reaches n2% of a total (B) of the number of the optical anisotropic structure domains.)

[3] The graphite carbon composite material according to [1] or [2] above, in which, in a polarizing microscope image of a sensitized color test plate in a cross-Nicols state which passed on along the cross-sections of the graphite particles appearing in the regions, when ten square regions with a side of 100 μm are randomly selected from the cross-section of the molding made of the graphite material, an area total value $C_{min}$ of smallest total values of areas of respective colors: magenta, blue, and yellow which are interference colors showing a direction of a graphite network of the optical anisotropic structure domains is 12 to 32% to a total cross-sectional area of the graphite particles with respect to the graphite material.

[4] The graphite carbon composite material according to any one of [1] to [3] above, in which, when ten square regions with a side of 100 μm are randomly selected from the cross-section of the molding made of the graphite material, the cross-sections of the graphite particles appearing in the regions satisfy the following condition with respect to the graphite material:

$$0.6\ \mu m^2 \leq Da(30) \leq 10\ \mu m^2$$

(in the above-mentioned expression, Da(n1) represents the same as that in [2] above.)

[5] The graphite carbon composite material according to any one of [1] to [4] above, in which, when ten square regions with a side of 100 μm are randomly selected from the cross-section of the molding made of the graphite material, the cross-sections of the graphite particles appearing in the regions satisfy the following conditions (1) to (3) with respect to the graphite material:

$$0.5\ \mu m^2 \leq Da(10) \leq 5\ \mu m^2 \quad (1)$$

$$0.6\ \mu m^2 \leq Da(50) \leq 50\ \mu m^2 \quad (2)$$

$$0.7\ \mu m^2 \leq Da(90) \leq 400\ \mu m^2 \quad (3)$$

(in the above-mentioned expressions, Da(n1) represents the same as that in [2] above.)

[6] The graphite carbon composite material according to any one of [1] to [5] above, in which the surfaces of the graphite particles constituting the graphite material are coated with another carbon material.

[7] The graphite carbon composite material according to [6] above, in which a part of a carbon fiber with a fiber diameter of 2 to 1,000 nm is bonded to the surface of the graphite particle.

[8] The graphite carbon composite material according to any one of [1] to [7] above, in which the carbon material on the way to a graphitized structure is obtained by subjecting easily-graphitizable carbon to heat treatment at 1,700 to 2,300° C.

[9] The graphite carbon composite material according to [8] above, in which the easily-graphitizable carbon is any one of petroleum-based coke, coal-based coke and mesocarbon microbeads.

[10] The graphite carbon composite material according to any one of [1] to [9] above, wherein the carbon material on the way to a graphitized structure is a material satisfying the condition of 0.1<IA/IB<0.9 in which IA and IB is the peak intensity assigned to (101) plane and (100) plane, respectively, by the X-ray powder diffraction method.

[11] The graphite carbon composite material according to any one of [1] to [10] above, in which the graphite material content is 100 parts by mass or more and 1000 parts by mass or less to 100 parts by mass of the content of the carbon material on the way to a graphitized structure.

[12] A carbon material for a battery electrode, comprising the graphite carbon composite material according to any one of [1] to [11] above.

[13] A paste for an electrode, comprising the carbon material for a battery electrode according to [12] above and a binder.

[14] An electrode, comprising a molding of the paste for an electrode according to [13] above.

[15] A battery, comprising the electrode according to [14] above as a constituent element.

[16] A lithium ion secondary battery, comprising the electrode according to [14] above as a constituent element.

[17] A method of producing the graphite carbon composite material according to any one of [1] to [11] above, wherein the method of producing the graphite material comprises subjecting a crude oil distilled residue, in which a total composition of an Asphaltene component and a resin component is 30% by mass to 80% by mass and a sulfur part is 0.3% by mass to 6% by mass, to delayed-coking with a heating furnace heater output temperature before a coke drum controlled to be 550° C. to 580° C., crushing the obtained carbon material, and performing graphitizing treatment on the crushed carbon material at a temperature of 2,000 to 3,300° C.

[18] The method of producing the graphite carbon composite material according to [17] above, in which a temperature for the graphitizing treatment is 2,500° C. to 3,300° C.

When the above-mentioned graphite carbon composite material is used as the carbon material for the battery electrode, a battery electrode capable of maintaining the high capacity, the high coulomb efficiency and the high cycle characteristics while having the high energy density can be obtained. Further, the graphite carbon composite material can be produced by the method excellent in economic efficiency and mass productivity with safety improved.

Figure 1:
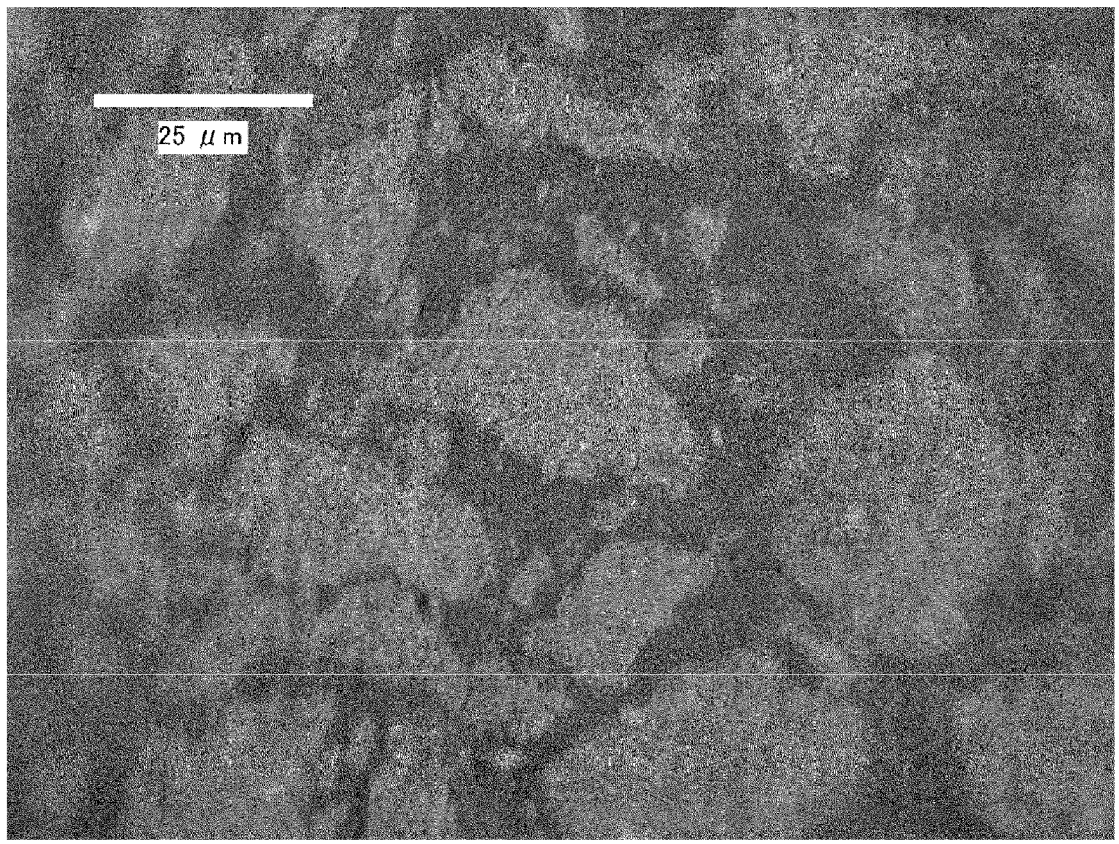
FIG. 1 A polarizing microscope image of graphite material A

BEST MODE FOR CARRYING OUT THE INVENTION (1) Graphite Material

[Production of Polarizing Microscope Observation Sample]

The "cross-section of the molding made of a graphite material" in the present specification is prepared as follows.

A double-stick tape is attached to the bottom of a sample container made of plastic with an internal volume of 30 cm$^3$, and two spatula scoops (about 2 g) of a sample for observation is placed on the double-stick tape. A curing agent (Curing Agent (M-agent) (trade name), produced by Nippon Oil and Fats Co., Ltd., available from Marumoto Struers K.K.) is added to cold mounting resin (Cold mounting resin #105 (trade name), produced by Japan Composite Co., Ltd., available from Marumoto Struers K.K.), and the mixture is kneaded for 30 seconds. The resultant mixture (about 5 ml) is poured slowly to the sample container to a height of about 1 cm and allowed to stand still for 1 day to be coagulated. Next, the coagulated sample is taken out and the double-stick tape is peeled off. Then, a surface to be measured is polished with a polishing machine with a rotary polishing plate.

The polishing is performed so that the polishing surface is pressed against the rotary surface. The polishing plate is rotated at 1,000 rpm. The polishing is performed successively, using #500, #1000, and #2000 of the polishing plates in this order, and finally, mirror-surface polishing is performed, using alumina (BAIKALOX type 0.3CR (trade name) with a particle diameter of 0.3 μm, produced by BAIKOWSKI, available from Baikowski Japan).

The polished sample is fixed onto a preparation with clay and observed with a polarizing microscope (BX51, produced by Olympas Corporation).

[Polarizing Microscope Image Analysis Method]

An image observed with the polarizing microscope is photographed by connecting a CAMEDIA C-5050 ZOOM digital camera produced by Olympas Corporation to the polarizing microscope through an attachment. The photographing mode is HQ2, 560×1,280, and the shutter time is 1.6 seconds. The photographing data is read using an image analysis device LUZEX AP produced by Nireco Corporation in a bmp format. The display form of color data is set to be IHP color (I, H, and P represent brightness, color hue, and purity, respectively). The image is captured with 2,560×1,920 pixels.

Regarding an image at a selected magnification, square regions (with a side of 100 μm) are cut out respectively from the same point at observation angles of 0° and 45°, and the entire particles within the range are analyzed as follows to obtain an average. The magnification used for analysis is an objective lens ×50 and one pixel=0.05 μm. Regarding the regions within the particles, colors of blue, yellow, magenta, black, and pure magenta are extracted, and area ratios thereof are counted. Although the optical anisotropic domain changes in color depending upon the direction of crystallite, the probability with which the domain is directed to right in front is very low. Therefore, even when magenta is displayed, the wavelength is slightly different from the case where pure magenta is displayed in most cases. On the other hand, the optical isotropic domain exhibits a wavelength of pure magenta all times. Thus, according to the present invention, pure magenta is all determined as the optical isotropic region.

For color extraction, a command of LUZEX AP is used, and for the extraction width of each color, data of IHP is set as shown in the following Table 1. Further, in order to remove noise, a region equal to or less than one dot is removed, using a W-1 command of ELIMINATE1 of a logical filter. For counting, the number of pixels is used, and the total number of pixels of an image and the number of pixels of the corresponding color are calculated.

TABLE 1

Extraction width of each color (width of each chart is 0 to 255)

| | I (Brightness) | H (Color hue) | P (Purity) |
|---|---|---|---|
| Blue | 255 to (3) | 255 to 200, 100 to 0 | 255 to (4) |
| Yellow | 255 to (2) | 170 to 100 | 255 to (4) |
| Magenta | 255 to (2) | 200 to 170 | 255 to (4) |
| Black | (2) to 0 | 255 to 0 | 255 to 0 |
| Pure magenta | 255 to (1) | 200 to 185 | 255 to (4) |

(1) A value corresponding to a maximum value of a peak of the region where a value is larger in a chart of brightness showing two peaks.
(2) A value corresponding to a valley between two peaks in the chart of brightness showing two peaks.
(3) A value corresponding to a maximum value of a peak of the region where a value is smaller in a chart of brightness showing two peaks.
(4) A value corresponding to a maximum value in a chart of purity.

It should be noted that, for black, a region satisfying any one of a maximum length of 20 μm or more and an area of 50 μm$^2$ or more is selected.

For the optical anisotropic structure, an area ratio of portions where color changes during the rotation at 0°, 45°, and 90° is calculated as shown in Table 2.

TABLE 2

Rotation angle and area ratio of each color (unit: %)

| | Blue | Yellow | Magenta | Black | Pure magenta |
|---|---|---|---|---|---|
| d00 | B1 | Y1 | M1 | K1 | PM1 |
| d45 | B2 | Y2 | M2 | K2 | PM2 |
| d90 | B3 | Y3 | M3 | K3 | PM3 |

Particle area (%)=$B1+Y1+M1+K1+PM1$

Optical isotropic area ratio (%)=$PM1$

Void area ratio (%)=$K1$

Optical anisotropic area ratio (%)=100−(Optical isotropic area ratio)−(Void area ratio)

Similarly, calculation is also performed with respect to d45 and d90, and an average value of d00, d45, and d90 is obtained as a value of the particles.

[Graphite Material]

The graphite material is basically formed of graphite particles formed of an optical anisotropic domain (domain in which crystal has developed and a graphite network is arranged), an optical isotropic domain (domain in which crystal has not developed enough or crystal is disturbed largely as in hard carbon), and a void in each particle. Here, the domain refers to a minimum unit structure of an optical anisotropic structure or an optical isotropic structure connected substantially.

In a preferred embodiment of the present invention, when ten square regions with a side of 100 μm are randomly selected in a cross-section of a molding made of the graphite material, a total area (x) of an optical anisotropic structure, a total area (y) of an optical isotropic structure, and a total area (z) of the void satisfy the following relationship on the cross-sections of the graphite particles appearing in the regions.

$$x:y:z=50 \text{ to } 97:3 \text{ to } 50:0 \text{ to } 10, \text{ and } x+y+z=100$$

Here, the cross-sections of the graphite particles appearing in the square region with a side of 100 μm selected randomly include only the cross-sectional parts of the particles without a void between the particles. x, y, and z are a total ratio of each structure with respect to the total of the cross-sectional parts of the particles, and the void represented by z is the void appearing on the particle cross-section (hereinafter, the term "void" refers to the above-mentioned void unless otherwise specified).

The optical anisotropic domain contributes to the insertion/elimination of lithium ions and the like. Therefore, basically, it is preferred that the amount of the optical anisotropic domain is larger, which leads to an increase in capacity. However, when the amount of the optical anisotropic domain is too large, and the area of the optical isotropic domain is below 3% of the entire area, a current load characteristic and a cycle characteristic are degraded extremely, which makes it impossible to keep balance of the materials.

Further, it is preferred that the amount of the void is as small as possible, because the void itself cannot contribute to the charge/discharge capacity, and the void as z is preferably 3% or less, more preferably 2% or less.

Specifically, preferably, the following relationship is satisfied.

$$x:y:z=70 \text{ to } 97:3 \text{ to } 30:0 \text{ to } 3, \text{ and } x+y+z=100$$

More preferably, the following relationship is satisfied.

$$x:y:z=90 \text{ to } 97:3 \text{ to } 10:0 \text{ to } 2, \text{ and } x+y+z=100$$

Further, the graphite material constituting the graphite particles in the preferred embodiment of the present invention is not occupied by the optical anisotropic domain having large particles. Of the optical anisotropic structure domain in the cross-sections of any 100 particles, when the maximum value of the length of a long side portion is defined as $L_{max}$ and an average particle diameter (D50) based on a volume measured by a laser diffraction method is defined as $L_{ave}$, $L_{max}/L_{ave}$ is 0.5 or less, preferably 0.4 or less, more preferably 0.3 or less.

If $L_{max}/L_{ave}$ is within this range, the optical anisotropic domain is sufficiently small, and the carbon network in each domain is directed in any direction without being aligned in one direction. Therefore, the expansion and contraction of crystallite during charging/discharging is dispersed, and as a result, the deformation amount of an electrode becomes small. This reduces the probability with which an electrical contact between the particles is lost even when charging/discharging is repeated, and enhances a cycle characteristic. Further, the probability with which edges of graphite through which ions enter and exit are present on the surface of an electrode increases, which is advantageous for a current load characteristic.

$L_{max}/L_{ave}$ can be calculated by measuring the maximum $L_{max}$ of the respective particles on the cross-sections of graphite particles appearing in the regions when ten square regions with a side of 100 μm are selected randomly in a cross-section of a molding made of the graphite material. $L_{ave}$ that is the average particle diameter (D50) based on a volume by a laser diffraction method can be measured using a laser diffraction type granular variation measurement device such as a Mastersizer produced by Malvern Instruments Ltd.

The graphite material in the preferred embodiment of the present invention is an assembly of graphite particles, and the graphite particles are not completely homogeneous. Therefore, the graphite material may contain particles that do not satisfy the above-mentioned condition of $L_{max}/L_{ave}$. However, the amount of the particles that do not satisfy the condition is less than 10%, preferably less than 5% based on the number of particles. That is, 90% or more of the graphite particles, preferably 95% or more of the graphite particles based on the number of particles satisfy the above-mentioned condition.

The size (proportion) of the optical anisotropic domain in the particles is as described above, and it is preferred that the following relationship be satisfied also in terms of the absolute value of a size. The absolute value of a size cannot be uniformly determined because the absolute value is also influenced by a particle diameter. However, when ten square regions with a side of 100 μm are selected randomly in a cross-section of a molding made of the graphite material, it is preferred that, among the number of optical anisotropic structure domains with an area of 0.1 μm$^2$ or more in the cross-sections of the graphite particles appearing in the regions, the number of the domains with an area of 25 μm$^2$ or less be 80% or more. More preferably, the number of the domains with an area of 15 μm$^2$ or less is 80% or more, and still more preferably, the number of the domains with an area of 10 μm$^2$ or less is 80% or more. The number is preferably 90% or more. When the area of one domain is too large, the expansion/contraction direction of the particles during charging/discharging tends to be concentrated, which degrades a cycle characteristic.

The size of the optical isotropic domain cannot be uniformly determined, either. However, it is preferred that, of the number of optical isotropic structure domains with an area of 0.1 μm$^2$ or more in the cross-section of any one particle, the number of optical isotropic structure domains with an area of 25 μm$^2$ or less be 80% or more. More preferably, the number of optical isotropic structure domains with an area of 15 μm$^2$ or less is 80% or more. Still more preferably, the number of optical isotropic structure domains with an area of 10 μm$^2$ or less is 80% or more. The number is preferably 90% or more. When the area of one domain is too large, the performance balance of the entire particles is lost, and consequently, a discharge capacity decreases extremely while a current load characteristic is excellent.

In terms of the distribution of a size of the optical anisotropic domain, the following defined range is preferred.

Specifically, in the case where, when ten square regions with a side of 100 μm are selected randomly on a cross-section of a molding made of a graphite material, Da(n1) is defined as an area value (μm$^2$) of the maximum domain when the total of integrated values reaches n1% of the total of the areas (μm$^2$) of the optical anisotropic structure domains when the areas of the optical anisotropic structure domains are integrated in an ascending order in the cross-sections of the graphite particles appearing in the regions, it is preferred that the following condition be satisfied.

$$0.6\ \mu m^2 \leq Da(30) \leq 10\ \mu m^2$$

Further, it is preferred that the following conditions be satisfied.

$$0.5\ \mu m^2 \leq Da(10) \leq 5\ \mu m^2$$

$$0.6\ \mu m^2 \leq Da(50) \leq 50\ \mu m^2$$

$$0.7\ \mu m^2 \leq Da(90) \leq 400\ \mu m^2$$

If each Da is out of this range, it becomes difficult to maintain balance among a discharge capacity, a current load characteristic, and a cycle characteristic.

Further, in the case where, when the optical anisotropic structure domains are arranged in an ascending order of the areas, Db(n2) is defined as an area value (μm$^2$) of the maximum domain when the total number of the arranged domains reaches n2% of the total (B) of the numbers of the optical anisotropic structure domains, it is preferred that the following condition be satisfied.

$$0.75 \leq Db(99.5)/Da(100) \leq 0.995$$

When this condition is not satisfied, it increases the variation in a domain area distribution in relatively large particles, which degrades the balance among the discharge capacity, the current load characteristic, and the cycle characteristic.

Further, in the case where, when the areas of the optical isotropic structure domains are integrated in an ascending order, Dc(n3) is defined as an area value (μm$^2$) of the maximum domain when the total of the integrated values reaches n3% of the total of the areas (μm$^2$) of the optical isotropic structure domains, it is preferred that the following conditions be satisfied.

$$0.5\ \mu m^2 \leq Dc(10) \leq 2\ \mu m^2$$

$$0.6\ \mu m^2 \leq Dc(50) \leq 10\ \mu m^2$$

$$0.7\ \mu m^2 \leq Dc(90) \leq 40\ \mu m^2$$

If each Dc is out of this range, it becomes difficult to maintain balance among a discharge capacity, a current load characteristic, and a cycle characteristic.

Not to make the expansion/contraction direction concentrate at a time of charging/discharging, which influences a cycle characteristic largely, the direction of the crystal (direction of a graphite network) in each optical anisotropic domain in the particles is preferably random. The direction of the crystal of the optical anisotropic structure can be confirmed by the change in the interference color of the domains in the case of rotating the domain by 45° from 0°. In this case, interference colors of blue, yellow and magenta are exhibited depending upon the direction of the crystal. However, it is preferred that, of the total value of the area of each color, the area value of the smallest area be substantially 12% or more of the cross-sectional area of one particle. What the term "substantially" refers to measuring 100 particles with respect to the color which accounts for the smallest area in the cross-section of one particle no matter what color it is, so as to determine the ratio of the color to the cross-sectional area of the measured particle, and calculating the average value thereof. More preferably, the area value is 20% or more. Most preferably, the area value is 32% for each color. By obtaining an average of the smallest one irrespective of each color, the randomness of the direction in which the crystal is directed can be expressed. When the crystal is biased in any direction, the degree of expansion/contraction of the particle during charging/discharging increases, which tends to lead to a decrease in the cycle characteristic.

It is preferred that the graphite material has an average interplanar spacing $d_{002}$ of plane (002) of 0.3356 nm to 0.3375 nm by the X-ray diffraction method. Further, a thickness Lc of the crystal in a C-axis direction is preferably 30 to 1,000 nm, more preferably 100 nm or less, particularly preferably 50 nm or more and 100 nm or less. By setting the average interplanar spacing and the thickness to be in such ranges, sites in which active materials are doped can be obtained sufficiently, and the number of edge portions of crystallite is not excessively large. Therefore, the decomposition of an electrolytic solution can be further suppressed. $d_{002}$ and $L_c$ can be measured using a powder X-ray diffraction (XRD) method by a known method (see I. Noda and M. Inagaki, Japan Society for the Promotion of Science, 117th Committee material, 117-71-A-1 (1963), M. Inagaki et al., Japan Society for the Promotion of Science, 117th committee material, 117-121-C-5 (1972), M. Inagaki, "carbon", 1963, No. 36, pages 25-34).

When the average interplanar spacing $d_{002}$ is in a range of 0.3356 nm to 0.3375 nm, the crystallinity of graphite is high and a space in which lithium ions can be intercalated increases.

In the preferred embodiment of the present invention, as crushing is not performed after carbonization or graphitization, a rhombus peak ratio is 5% or less, more preferably 1% or less.

When the graphite material falls in such ranges, an interlayer compound with lithium is formed smoothly. If the interlayer compound is used as a negative electrode material in a lithium secondary battery, the lithium adsorption/desorption reaction is hardly inhibited, which enhances a rapid charging/discharging characteristic.

It should be noted that the peak ratio (x) of the rhombohedral structure in graphite powder is obtained from actually measured peak strength (P1) of a hexagonal structure (100) plane and actually measured peak strength (P2) of a rhombohedral structure (101) plane by the following expression.

$$x = P2/(P1+P2)$$

The average interplanar spacing $d_{002}$ of the optical anisotropic portions in the graphite material is preferably 0.3354 nm to 0.3370 nm. If the average interplanar spacing $d_{002}$ is larger than this range, a discharge capacity becomes small, which makes it difficult to satisfy the energy density required for a large battery.

The average interplanar spacing of the optical anisotropic portions can be calculated as follows. First, tungsten is deposited from vapor onto a sample surface by sputtering and formed into thin chips by a microtome of a transmission-type electronic microscope (for TEM). The thin chips are enlarged at a magnification of 8,000,000 or more by the TEM and printed or printed onto a printing sheet. Of those, a portion in which a crystal network of graphite is vividly photographed is measured for an interplanar spacing at 100 points using a vernier caliper and the results are converted in nm based on a scale bar on the TEM photograph to obtain an average.

An aspect ratio: maximum length $D_{max}$/maximum length vertical length $DN_{max}$ ($D_{max}$: maximum length at two points on a contour of a particle image, $DN_{max}$: shortest length connecting two straight lines vertically, when an image is sandwiched between two straight lines parallel to the maximum length) of particles of graphite material is preferably 1.00 to 1.32. The aspect ratio is more preferably 1.00 to 1.20. By setting the aspect ratio of the particles to be small, a high-density electrode satisfying the energy density required for a large battery can be produced.

The aspect ratio of the particles can be measured by image analysis, using FPIA3000 produced by Sysmex Corporation. As for measurement points, at least 3,000 points, preferably 30,000 points or more, more preferably 50,000 points or more are measured and a calculated average value is used.

The D50 in the graphite material is preferably 3 to 20 μm in a particle diameter distribution based on a volume measured by a laser diffraction method. As a laser diffraction type granular variation measurement device, a Mastersizer produced by Malvern Instruments Ltd. or the like can be used. Further, it is preferred that the graphite material does not substantially contain particles with a particle diameter of 0.5 μm or less. The particles with a particle diameter of 0.5 μm or less have a large active point on the surface, which decreases an initial efficiency of the battery. The content of the particles with a particle diameter of 0.5 μm or less can be measured by the laser diffraction type granular variation measurement device. Further, a substantial minimum particle diameter can also be obtained by measuring D0.

It is preferred that the loose bulk density (0 tapping) of the graphite material be 0.7 g/cm$^3$ or more, and the powder density (tap density) when tapping is performed 400 times be 0.8 to 1.6 g/cm$^3$. The powder density is more preferably 0.9 to 1.6 g/cm$^3$, most preferably 1.1 to 1.6 g/cm$^3$.

The loose bulk density is obtained by dropping 100 g of the sample to a graduated cylinder from a height of 20 cm, and measuring the volume and mass without applying a vibration. The tap density is obtained by measuring the volume and mass of 100 g of powder tapped 400 times using an Autotap produced by Quantachrome Instruments.

These methods are based on ASTM B527 and JIS K5101-12-2, and the fall height of the Autotap in the tap density measurement is 5 mm.

By setting the loose bulk density to be 0.7 g/cm$^3$ or more, the electrode density before pressing at a time of application to an electrode can be enhanced further. Based on this value, it can be predicted whether or not a sufficient electrode density can be obtained by one roll pressing. Further, if the tap density is within the above-mentioned range, the electrode density achieved during pressing can be enhanced sufficiently.

[Method of Producing the Graphite Material]

According to the method of producing the graphite material, a graphite material of the present invention can be produced, for example, by crushing a carbon material obtained by the following method, followed by heat treatment at 2,000° C. or more.

As the carbon material, for example, a residue obtained by distilling crude oil under a normal atmospheric pressure or a reduced pressure in an oil refining process, pyrolytic tar, etc. can be used preferably.

As the crude oil to be an origin of the carbon material, crude oil containing naphthenic hydrocarbon in a large amount is preferred. If the amount of paraffin-based hydrocarbon or olefin-based hydrocarbon increases in an amount, it slows down the processing of carbonization during coking, and optical anisotropic domains and the like develop too much.

The ratio of the following components of the carbon material is important because the ratio largely influences the subsequent composition, in particular, the area and distribution of domains, optical anisotropy, a ratio of optical isotropic structures, etc.

When the above-mentioned distilled residue, tar, or the like is used as a material, it is desired that the content of Asphaltene, a resin component, and a saturated hydrocarbon component contained in the material be high. Asphaltene is a dark brown brittle solid, which is a substance having a small condensed polycylic structure of H/C. Asphaltene is soluble in benzene, carbon tetrachloride, or the like and is insoluble in pentane, alcohol, etc., and has a molecular weight of 1,000 or more. Examples of Asphaltene include a sulfur compound mainly comprising a polycyclic compound such as a thiophene ring, a naphthene ring, and an aromatic ring, a nitrogen compound mainly comprising a pyrrole ring and a pyridine ring, and the like. Further, the resin component is a brown resinous substance and a compound containing oxygen and nitrogen in a large amount.

Regarding the composition of the carbon material, it is desired that the total of the compositions of the Asphaltene component and the resin component be 20% by mass to 60% by mass, preferably 25% by mass to 40% by mass. When the total compositions of the Asphaltene component and the resin component is small, crystal develops too slowly during coking by a Delayed Coker, and hence, optical anisotropic domain develops into a large one. When the optical anisotropic domain develops into a large one, as the characteristics of a negative electrode material after graphitization, a current load characteristic and a cycle characteristic are degraded largely although a discharge capacity increases. When the total compositions of the Asphaltene component and the resin component is too large, the ratio of the optical isotropic structure increases too much, which suppresses the development of crystal.

The Asphaltene component and the resin component in the carbon material refer to the components whose contents are measured based on "Composition Analysis Method of Asphalt by Column Chromatography (JPI-5S-22-83)" defined by The Japan Petroleum Institute (JPI). In this method, using alumina as a filler, an Asphaltene component is separated and quantified from sample oil together with a saturated component, an aromatic component, and a resin component.

Further, the amount of the sulfur compound component mainly comprising a polycyclic compound such as a thiophene ring, a naphthene ring, and an aromatic ring is preferably 0.3% by mass to 6% by mass, more preferably 0.4% by mass to 6% by mass. When the amount of the sulfur compound component is small, crystal develops too gently during coking by a Delayed Coker, and hence, optical anisotropic domain develops into a large one. When the optical anisotropic domain develops into a large one, as the characteristics of a negative electrode material after graphitization, a current load characteristic and a cycle characteristic are degraded largely although a discharge capacity increases. Further, when the amount of the sulfur compound component is too large, disturbed crystal develops due to excess sulfur component. Thus, although the unit domain area decreases, the crystallinity after graphitization is deteriorated, and a discharge capacity decreases remarkably. Further, particles are hardened too much, and electrode density does not increase any more.

It should be noted that the sulfur compound component in the present invention refers to a value of a sulfur component analyzed according to JISK2541.

Further, residual oil (FCC bottom oil) of Fluid Catalytic Cracking (FCC) has an aromatic index (fa) of about 0.8, which is suitable. Therefore, in a high crystal coke production process, the crystallinity of coke is enhanced by coking with the addition of the residual oil frequently. However, in the present invention, it is not preferred that the FCC bottom oil is added, because a domain develops too much.

These materials are put in a delayed coking process. At this time, a heating furnace heater output temperature before a coke drum is generally regulated to be 480 to 500° C. Regarding the carbon material, the heating furnace is operated at a temperature range raised by about 10%, i.e., 560 to 570° C. Preferably, although the pressure in the drum is generally regulated to be 100 to 280 kPa (about 15 psig to 40 psig), the operation is performed at a pressure raised by about 10%, i.e., 115 to 305 kPa (about 17 psig to 44 psig).

Coke is generally generated as a lump, and hence, the coke is generally discharged while being cut into round slices with water flow. However, when the operation is performed with the materials defined and the coking conditions defined, particulate coke different from those which are usually obtained can be obtained.

When the particulate special coke thus obtained is graphitized later, the internal structure thereof falls within a predetermined range, and a discharge capacity, a current load characteristic, and a cycle characteristic are balanced, which is preferred. Although it is not necessarily clear why the graphite material formed of a particulate carbon material exhibits such characteristics, the reason is considered as follows: heavy tar comprising the above-mentioned component is present in a spherical shape owing to the viscosity, and it is assumed that the spherical tar is carbonized rapidly with reaction heat caused by a cross-linking reaction of an Asphaltene component partly due to the presence of sulfur.

Due to such operation, the generation of structures that tend to develop to optical anisotropic structures is suppressed to a medium degree compared to the case of coke that is generally obtained, and a carbon material suitable as graphite material can be obtained.

It is preferred that, when the obtained carbon material is heated from 300° C. to 1,200° C. in an inactive atmosphere, weight reduction on heating (for example, a volatile component of hydrocarbon involved in carbonization) is 5 to 20% by mass.

The carbon material whose weight reduction on heating is less than 5% by mass tends to form plate-shaped particles after crushing. Further, a crushed surface (edge portion) is exposed, and a specific area increases, which also increases side reaction. On the contrary, in the carbon material whose weight reduction on heating exceeds 20% by mass, particles adhere to each other in a large amount after graphitization, which influences a yield.

Next, the carbon material is crushed. For crushing the carbon material, known jet milling, hammer milling, roller milling, pin milling, vibration milling, or the like is used. It is preferred that the carbon material be crushed in a state in which a thermal hysteresis is as low as possible. When a thermal hysteresis is lower, the carbon material has a low hardness and is easily crushed, and since the cracks during crushing have almost random directions, it tends to have a smaller aspect ratio. Further, a probability with which an edge portion exposed in the crushed surface is recovered in a later heating process increases, and this has an effect of reducing side reaction during charging/discharging.

It is preferred that the crushed carbon material be classified so that an average particle diameter (D50) based on a volume measured by the laser diffraction method is 3 to 20 µm. When the average particle diameter is large, the electrode density is less likely to increase. In contrast, when the average particle diameter is small, side reaction tends to occur during charging/discharging. It should be noted that the particle size is a value measured by a Mastersizer (produced by Malvern Instruments Ltd.) of a laser diffraction type.

The crushed carbon material may be sintered at a low temperature of about 500 to 1,200° C. in a non-oxidative atmosphere before graphitization. The low-temperature sintering can reduce the generation of gas in the subsequent graphitization and can also lower the bulk density, which can reduce a cost for graphitization.

It is desired that the graphitization of the crushed carbon material be performed in an atmosphere in which the carbon material is less likely to be oxidized. Examples thereof include a method of conducting heat treatment in an atmosphere of argon gas or the like and a method of conducting heat treatment in an Acheson furnace (non-oxidative graphitization process). The non-oxidative graphitization process is preferred in terms of cost.

The lower limit of the graphitization temperature is generally 2,000° C., preferably 2,500° C., more preferably 2,900° C., most preferably 3,000° C. Although the upper limit of the graphitization is not particularly limited, the upper limit is preferably 3,300° C. because a high discharge capacity is obtained easily.

After the graphitization, it is preferred that the graphite material be not shredded or crushed. If the graphite material is shredded or crushed after the graphitization, there is a possibility that the smoothened surface may be damaged, which degrades the performance.

[Composite Material and Mixed Material]

The graphite material can be used under the condition of being coated with another carbon material.

For example, the surface of graphite particles forming the graphite material can be coated with optical isotropic carbon. The coating can improve an input characteristic during charging, which enhances the characteristics required for a large battery. Although the coating amount is not particularly limited, the amount of the coating material is preferably 0.1 to 10 parts by mass based on 100 parts by mass of a core.

As the coating method, a known technology can be used, which is not particularly limited. For example, the coating can be carried out by a method of performing coating of graphite particles by a mechanochemical method with Mechanofusion produced by Hosokawa Micron Corporation, using a coal-tar pitch of a diameter of 0.1 to 1 µm. and a graphite material, and heating the graphite particles at 800° C. to 3,300° C. in a non-oxidative atmosphere to form optical isotropic carbon on the surface; and a method of allowing a composition containing a polymer to adhere to at least a partial surface of graphite particles and heat-treating the graphite particles at 800° C. to 3,300° C. in a non-oxidative atmosphere to form optical isotropic carbon on the surface. As the composition containing a polymer, for example, a composition containing dry oil or aliphatic acid thereof and a phenol resin may be used. The latter method is described in, for example, JP 2003-100293 A and JP 2005-019397 A.

Further, part of carbon fiber can adhere to the surface of the graphite particles. By allowing the carbon fiber to adhere to the surface of the graphite particles, the carbon fiber in an electrode is easily dispersed, and the cycle characteristic and the current load characteristic are further enhanced due to the synergetic effect of the carbon fiber in combination with the characteristics of the graphite particles serving as the core material. Although the adhesion amount of the carbon fiber is not particularly limited, the adhesion amount is preferably 0.1 to 5 parts by mass in terms of 100 parts by mass of the graphite material serving as a core.

As the adhesion method, a known method may be used, which is not particularly limited. For example, using a coal-tar pitch with a diameter of 0.1 to 1 µm, a graphite material and carbon fiber, carbon fiber is allowed to adhere to the graphite particles during the coating of the graphite particles by a mechanochemical method with a Mechanofusion produced by Hosokawa Micron Corporation, followed by heating at 800° C. to 3,300° C. in a non-oxidative atmosphere. Further, a composition containing a polymer is allowed to adhere to at least a partial surface of the graphite particles, fibrous carbon is mixed with the graphite particles, the fibrous carbon is allowed to adhere to the graphite particles via the composition containing a polymer, and then the graphite particles are heat-treated at 800° C. to 3,300° C. in a non-oxidative atmosphere, thereby carrying out the coating. As the composition containing a polymer, for example, a composition containing dry oil or aliphatic acid thereof and a phenol resin can be used. The latter method is described in, for example, JP 2003-100293 A and JP 2005-019397 A (WO 2004/109825).

Examples of the carbon fiber include: organic carbon fiber such as PAN-based carbon fiber, pitch-based carbon fiber, and rayon-based carbon fiber; and vapor-grown carbon fiber. Of those, particularly preferred is vapor-grown carbon fiber having high crystallinity and high heat conductivity. In the case of allowing the carbon fiber to adhere to the surfaces of the graphite particles, particularly preferred is vapor-grown carbon fiber.

Vapor-grown carbon fiber is, for example, produced by: using an organic compound as a material; introducing an organic transition metal compound as a catalyst into a high-temperature reaction furnace with a carrier gas to form fiber; and then conducting heat treatment (see, for example, JP 60-54998 A and JP 2778434 B2). The vapor-grown carbon fiber has a fiber diameter of 2 to 1,000 nm, preferably 10 to 500 µm, and has an aspect ratio of preferably 10 to 15,000.

Examples of the organic compound serving as a material for carbon fiber include toluene, benzene, naphthalene, ethylene, acetylene, ethane, natural gas, a gas of carbon monoxide or the like, and a mixture thereof. Of those, an aromatic hydrocarbon such as toluene or benzene is preferred.

The organic transition metal compound includes a transition metal serving as a catalyst. Examples of the transition metal include metals of Groups IVa, Va, VIIa, VIIa, and VIII of the periodic table. Preferred examples of the organic transition metal compound include compounds such as ferrocene and nickelocene.

The carbon fiber may be obtained by crushing or shredding long fiber obtained by vapor deposition or the like. Further, the carbon fiber may be coagulated on a flock.

Carbon fiber which has no pyrolyzate derived from an organic compound or the like adhering to the surface thereof or carbon fiber which has a carbon structure with high crystallinity is preferred.

The carbon fiber with no pyrolyzate adhering thereto or the carbon fiber having a carbon structure with high crystallinity can be obtained, for example, by sintering (heat-treating) carbon fiber, preferably, vapor-grown carbon fiber in an inactive gas atmosphere. Specifically, the carbon fiber with no pyrolyzate adhering thereto is obtained by heat treatment in inactive gas such as argon at about 800° C. to 1,500° C. Further, the carbon fiber having a carbon structure with high crystallinity is obtained by heat treatment in inactive gas such as argon preferably at 2,000° C. or more, more preferably 2,000° C. to 3,000° C.

It is preferred that the carbon fiber contains branched fiber. Further, a portion having a hollow structure in which the fiber as a whole communicates with each other may be present. For this reason, carbon layers forming a cylindrical portion of the fiber are formed continuously. The hollow structure refers to a structure in which a carbon layer is wound in a cylindrical shape and includes an incomplete cylindrical structure, a structure having a partially cut part, two stacked carbon layers connected into one layer, and the like. Further, the cross-section is not limited to a complete circular cross-section, and the cross-section of the cylinder includes an oval cross-section or a polygonal cross-section.

Further, the average interplanar spacing $d_{002}$ of a (002) plane by the X-ray diffraction method of the carbon fiber is preferably 0.344 nm or less, more preferably 0.339 nm or less, particularly preferably 0.338 nm or less. Further, it is preferred that a thickness ($L_c$) in a C-axis direction of crystal be 40 nm or less.

(2) Carbon material on the way to a graphitized structure of easily-graphitizable carbon The carbon material on the way to a graphitized structure is a material, in which graphitization is not been completed, and can be obtained by subjecting easily-graphitizable carbon to heat treatment at 1700 to 2300° C. The easily-graphitizable carbon is not particularly limited and examples thereof include petroleum cokes, coal cokes and mesocarbon microbeads.

The easily-graphitizable carbon is adjusted to have a determined particle size prior to the heat treatment. The particle size adjustment is generally performed by pulverization and classification. A known jet mill, hammer mill, roller mill, pin mill, vibration mill and the like is used for the pulverization of the easily-graphitizable carbon. It is desirable to perform the pulverization of the easily-graphitizable carbon in a state where the thermal budget is reduced as much as possible. With a low thermal budget, the easily-graphitizable carbon has lower hardness and is easy to be pulverized. Furthermore, the crack direction in the crushing process becomes almost at random, and the easily-graphitizable carbon tends to have a low aspect ratio. Also, it leads to higher probability that the edge portion exposed in the crashing surface becomes repaired during the later heating process, which has an effect of reducing side reaction at the time of charging and discharging.

It is desirable to classify the pulverized carbon material so as to have a volume-basis average particle size (D50) measured by laser diffractometry of 3 to 20 μm. When an average particle size is large, the electrode density tends not to increase, while when an average particle size is small, a side reaction is more likely to occur at the time of charging and discharging. The particle diameter size is measured by the laser diffraction type Mastersizer produced by Malvern Instruments Ltd.

It is desirable to perform the heat treatment of the easily-graphitizable carbon which has been subjected to the particle size adjustment in an atmosphere such that the easily-graphitizable carbon is difficult to oxidize. Examples of the heat treatment method include a method of heat treatment under atmosphere of argon gas and the like and a method of heat treatment in an Atchison furnace (non-oxidizing heating process). Among these, the non-oxidizing heating process is preferable from a cost viewpoint. The lower limit of the heat treatment temperature is generally 1600° C. and preferably 1700° C., and more preferably 1800° C. The upper limit of the heat treatment is generally 2300° C. and preferably 2100° C., and more preferably 2000° C. In the temperature range, the graphite crystals are in the course of development and the carbon material has a discharge capacity as low as about 250 mAh/g. However, the material has a solid inner structure and is excellent particularly in large current-input/output characteristics and cycle characteristics.

The characteristics of the crystals of the easily-graphitizable carbon subjected to heat treatment in the above-mentioned temperature range are described below.

When the easily-graphitizable carbon is measured by x-ray powder diffraction using a Cu—Kα ray as a target, diffraction peak A (assigned to the (101) plane) in the vicinity of 2θ=44° which indicates a three-dimensional structure of graphite can be observed. Meanwhile, peak B (assigned to the (100) plane) in the vicinity of 2θ=42° which indicates the spread of the crystals in the planar direction is also observed. In the relation between peak intensity A (IA) and peak intensity B (IB), IA/IB=0 means a state that no crystals are developed.

In the carbon material which is not completely graphitized, the relation between IA and IB is preferably 0.1<IA/B<0.9 and more preferably 0.5<IA/IB<0.8. When IA/IB is too small, a graphite structure ratio is too low, which results in significant reduction in cycle characteristics and is not desirable. On the other hand, when IA/IB is too large, the crystal structure has developed too much such that the sites capable of accommodating lithium ions are reduced, which results in significant reduction in large current-input/output characteristics and is not desirable.

(3) Graphite Carbon Composite Material

The graphite carbon composite material comprises the above-mentioned graphite material and carbon material on the way to a graphitized structure. The mixing method is not particularly limited as long as an ordinary mixer for fine particles is used, but a mixer having a high-speed chopper such as a Henschel mixer and Spartan granulator; a Nauta mixer; a ribbon mixer and the like enables high-speed homogenization.

With respect to the content of the graphite material and carbon material on the way to a graphitized structure, the content of the graphite material can be randomly selected within the range of 10 parts by mass to 1000 parts by mass to 100 parts by mass of the carbon material on the way to a graphitized structure, depending on the desired battery performance. When input/output electric power up to about 5 C is demanded, a battery having a high capacity can be obtained by mixing the graphite material in an amount of preferably 100 parts by mass or more and more preferably 120 parts by mass or more. When input/output electric power of about 10 C is demanded, the total discharge capacity can be increased by mixing the graphite material in an amount of preferably 70 parts by mass or less and more preferably 50 parts by mass or less. The same ratio shall apply in the case where the graphite material is a material coated with the other carbon material.

When the graphite material is mixed into the carbon material on the way to a graphitized structure, a discharge capacity can be improved while maintaining the large current-input/output characteristics inherent to the carbon material on the way to a graphitized structure.

(4) Various uses

[Carbon Material for a Battery Electrode]

The carbon material for a battery electrode of the present invention contains the above-mentioned graphite carbon composite material. When the above-mentioned graphite carbon composite material is used as a carbon material for a battery electrode, a battery electrode capable of maintaining ultralong-term cycle characteristics and large current-input/output characteristics while having a high energy density can be obtained.

The carbon material for a battery electrode may be used as, for example, a negative electrode active material and an agent for imparting conductivitiy to a negative electrode of a lithium ion secondary battery.

Carbon fiber may also be mixed with the carbon material for a battery electrode. As the carbon fiber, carbon fiber similar to the carbon fiber described above may be used. The mixing amount is 0.01 to 20 parts by mass, preferably 0.5 to 5 parts by mass in terms of total 100 parts by mass of the above-mentioned graphite material and the carbon material on the way to a graphitized structure.

[Paste for an Electrode]

The paste for an electrode of the present invention contains the above-mentioned carbon material for a battery electrode and a binder. The paste for an electrode can be obtained by kneading the carbon material for a battery electrode with a binder. A known device such as a ribbon mixer, a screw-type kneader, a Spartan Granulator, a Loedige Mixer, a planetary mixer, or a universal mixer may be used for kneading. The paste for an electrode may be formed into a sheet shape, a pellet shape, or the like.

Examples of the binder to be used for the paste for an electrode include known binders such as: fluorine-based polymers such as polyvinylidene fluoride and polytetrafluoroethylene; and rubber-based binders such as styrene-butadiene rubber (SBR).

The appropriate use amount of the binder is 1 to 30 parts by mass in terms of 100 parts by mass of the carbon material for a battery electrode, and in particular, the use amount is preferably about 3 to 20 parts by mass.

A solvent can be used at a time of kneading. Examples of the solvent include known solvents suitable for the respective binders such as: toluene and N-methylpyrolidone in the case of a fluorine-based polymer; water in the case of SBR; dimethylformamide; and isopropanol. In the case of the binder using water as a solvent, it is preferred to use a thickener together. The amount of the solvent is adjusted so as to obtain a viscosity at which a paste can be applied to a collector easily.

[Electrode]

An electrode is formed of a molding of the above-mentioned paste for an electrode. The electrode is obtained, for example, by applying the paste for an electrode to a collector, followed by drying and pressure molding.

Examples of the collector include foils and mesh of aluminum, nickel, copper, stainless steel and the like. The coating thickness of the paste is generally 50 to 200 μm. When the coating thickness becomes too large, a negative electrode may not be placed in a standardized battery container. There is no particular limitation to the paste coating method, and an example of the coating method includes a method involving coating with a doctor blade or a bar coater, followed by molding with roll pressing or the like.

Examples of the pressure molding include roll pressure molding, compression molding, and the like. The pressure for the pressure molding is preferably about 1 to 3 t/cm². As the electrode density of the electrode increases, the battery capacity per volume generally increases. However, if the electrode density is increased too much, the cycle characteristic is generally degraded. If the paste for an electrode in a preferred embodiment of the present invention is used, the degradation in the cycle characteristic is small even when the electrode density is increased. Therefore, an electrode having the high electrode density can be obtained. The maximum value of the electrode density of the electrode obtained using the paste for an electrode in a preferred embodiment of the present invention is generally 1.7 to 1.9 g/cm³. The electrode thus obtained is suitable for a negative electrode of a battery, in particular, a negative electrode of a secondary battery.

[Battery, secondary battery]

A battery or a secondary battery can be produced, using the electrode as a constituent element (preferably, as a negative electrode).

The battery or secondary battery of the present invention is described by taking a lithium ion secondary battery as a specific example. The lithium ion secondary battery has a structure in which a positive electrode and a negative electrode are soaked in an electrolytic solution or an electrolyte. As the negative electrode, the electrode in a preferred embodiment of the present invention is used.

In the positive electrode of the lithium ion secondary battery, a transition metal oxide containing lithium is generally used as a positive electrode active material, and preferably, an oxide mainly containing lithium and at least one kind of transition metal element selected from the group consisting of Ti, V, Cr, Mn, Fe, Co, Ni, Mo, and W, which is a compound having a molar ratio of lithium to a transition metal element of 0.3 to 2.2, is used. More preferably, an oxide mainly containing lithium and at least one kind of transition metal element selected from the group consisting of V, Cr, Mn, Fe, Co, and Ni, which is a compound having a molar ratio of lithium to a transition metal of 0.3 to 2.2, is used. It should be noted that Al, Ga, In, Ge, Sn, Pb, Sb, Bi, Si, P, B, and the like may be contained in a range of less than 30% by mole with respect to the mainly present transition metal. Of the above-mentioned positive electrode active materials, it is preferred that at least one kind of material having a spinel structure represented by a general formula $Li_xMo_2$ (M represents at least one kind of Co, Ni, Fe, and Mn, and $0<x\leq1.2$), or $Li_yN_2O_4$ (N contains at least Mn, and $0<y\leq2$) be used.

Further, as the positive electrode active material, there may be particularly preferably used at least one kind of materials each including $Li_yM_aD_{1-a}O_2$ (M represents at least one kind of Co, Ni, Fe, and Mn, D represents at least one kind of Co, Ni, Fe, Mn, Al, Zn, Cu, Mo, Ag, W, Ga, In, Sn, Pb, Sb, Sr, B, and P with the proviso that the element corresponding to M being excluded, y=0 to 1.2, and a=0.5 to 1) and materials each having a spinel structure represented by $Li_z(N_bE_{1-b})_2O_4$ (N represents Mn, E represents at least one kind of Co, Ni, Fe, Mn, Al, Zn, Cu, Mo, Ag, W, Ga, In, Sn, Pb, Sb, Sr, B and P, b=1 to 0.2, and z=0 to 2).

Specifically, there are exemplified $Li_xCoO_2$, $Li_xNiO_2$, $Li_xMnO_2$, $Li_xCo_aNi_{1-a}O_2$, $Li_xCo_bV_{1-b}O_z$, $Li_xCo\,Fe_{1-b}O_2$, $Li_xMn_2O_4$, $Li_xMn_xCo_{2-c}O_4$, $Li_xMn_xNi_{2-c}O_4$, $Li_xMn_cV_{2-c}O_4$, and $Li_xMn_cFe_{2-c}O_4$ (where, x=0.02 to 1.2, a=0.1 to 0.9, b=0.8 to 0.98, c=1.6 to 1.96, and z=2.01 to 2.3). As the most preferred transition metal oxide containing lithium, there are given $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (x=0.02 to 1.2, a=0.1 to 0.9, b=0.9 to 0.98, and z=2.01 to 2.3). It should be noted that the value of x is a value before starting charge and discharge, and the value increases and decreases in accordance with charge and discharge.

Although the average particle size of the positive electrode active material is not particularly limited, the size is preferably 0.1 to 50 μm. It is preferred that the volume of the particles of 0.5 to 30 μm be 95% or more. It is more preferred that the volume occupied by the particle group with a particle diameter of 3 μm or less be 18% or less of the total volume, and the volume occupied by the particle group of 15 μm or more and 25 μm or less be 18% or less of the total volume. Although the specific area is not particularly limited, the area is preferably 0.01 to 50 m$^2$/g, particularly preferably 0.2 m$^2$/g to 1 m$^2$/g by a BET method. Further, it is preferred that the pH of a supernatant obtained when 5 g of the positive electrode active material is dissolved in 100 ml of distilled water be 7 or more and 12 or less.

In a lithium ion secondary battery, a separator may be provided between a positive electrode and a negative electrode. Examples of the separator include non-woven fabric, cloth, and a microporous film each mainly containing polyolefin such as polyethylene and polypropylene, a combination thereof, and the like.

As an electrolytic solution and an electrolyte forming the lithium ion secondary battery of the present invention, a known organic electrolytic solution, inorganic solid electrolyte, and polymer solid electrolyte may be used, but an organic electrolytic solution is preferred in terms of electric conductivity.

As the organic electrolytic solution, preferred is a solution of an organic solvent such as: an ether such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, or ethylene glycol phenyl ether; an amide such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, or hexamethylphosphorylamide; a sulfur-containing compound such as dimethylsulfoxide or sulfolane; a dialkyl ketone such as methyl ethyl ketone or methyl isobutyl ketone; a cyclic ether such as ethylene oxide, propylene oxide, tetrahydrofuran, 2-methoxytetrahydrofuran, 1,2-dimethoxyethane, or 1,3-dioxolan; a carbonate such as ethylene carbonate or propylene carbonate; γ-butyrolactone; N-methylpyrrolidone; acetonitrile; nitromethane; or the like. Further, there are preferably exemplified: esters such as ethylene carbonate, butylene carbonate, diethyl carbonate, dimethyl carbonate, propylene carbonate, vinylene carbonate, and γ-butyrolactone; ethers such as dioxolan, diethyl ether, and diethoxyethane; dimethylsulfoxide; acetonitrile; tetrahydrofuran; and the like. A carbonate-based nonaqueous solvent such as ethylene carbonate or propylene carbonate may be particularly preferably used. One kind of those solvents may be used alone, or two or more kinds thereof may be used as a mixture.

A lithium salt is used for a solute (electrolyte) of each of those solvents. Examples of a generally known lithium salt include $LiClO_4$, $LiBF_4$, $LiPF_6$, $LiAlCl_4$, $LiSbF_6$, LiSCN, LiCl, $LiCF_3SO_3$, $LiCF_3CO_2$, $LiN(CF_3SO_2)_2$, and the like.

Examples of the polymer solid electrolyte include a polyethylene oxide derivative and a polymer containing the derivative, a polypropylene oxide derivative and a polymer containing the derivative, a phosphoric acid ester polymer, a polycarbonate derivative and a polymer containing the derivative, and the like.

It should be noted that there is no constraint for the selection of members required for the battery configuration other than the aforementioned members.

EXAMPLES

Hereinafter, the present invention is described in more detail by way of typical examples. It should be noted that these examples are merely for illustrative purposes, and the present invention is not limited thereto.

It should be noted that, as for graphite material particle of Examples and Comparative Examples, the optical anisotropic structure area ratio, optical isotropic structure area ratio, gap area ratio, ratios of Da(n1), Db(n2), Dc(n3), and $C_{min}$, $L_{max}/L_{ave}$, average interplanar spacing ($d_{002}$) by an X-ray diffraction method, Lc, an average interplanar spacing ($d_{002}$) by TEM, an aspect ratio, average particle diameters D0 and D50, a tap density (0 times) (loose bulk density), and tap density (400 times) are measured by the method described in detail in the "Best Mode for carrying out the Invention" of the specification. Further, the specific surface area measurement and battery evaluation (high-rate discharge capacity keeping ratio, high-rate charge/discharge cycle capacity keeping ratio, electrode density, and volume energy density) are performed by the following methods.

[Specific Surface Area]

Using a specific area measurement apparatus NOVA-1200 (produced by Yuasa Ionics Inc.), a specific surface area is measured by a BET method that is a general measurement method of a specific surface area.

[Battery Evaluation Method]

(1) Production of Paste:

To 1 part by mass of a graphite material, 0.1 part by mass of KF polymer L1320 produced by Kureha Corporation (N-methylpyrrolidone (NMP) solution containing 12% by mass of polyvinylidene fluoride (PVDF)) is added, and the mixture is kneaded by a planetary mixer to obtain a main undiluted solution.

(2) Production of an Electrode:

NMP is added to the main undiluted solution and the viscosity thereof is adjusted. After that, the resultant solution is applied to a high-purity copper foil to a thickness of 250 μm using a doctor blade. The high-purity copper foil thus obtained is dried in vacuum at 120° C. for 1 hour and punched into a size of 18 mmΦ. The electrode thus punched out is sandwiched between pressing plates made of super-steel and pressed so that a press pressure becomes about $1 \times 10^2$ to $3 \times 10^2$ N/mm$^2$ ($1 \times 10^3$ to $3 \times 10^3$ kg/cm$^2$) with respect to the electrode. Then, the electrode is dried in a vacuum drier at 120° C. for 12 hours to obtain an electrode for evaluation.

(3) Production of a Battery:

A triode cell is produced as follows. The following operation is performed in a dry argon atmosphere at a dew point of −80° C. or less.

In a cell (inner diameter: about 18 mm) with a screwed-type lid made of polypropylene, the carbon electrode with a copper foil produced in the above-mentioned item (2) and a metal lithium foil are sandwiched and stacked between separators (microporous films made of polypropylene (Cell Guard 2400)). Further, metal lithium for reference is stacked in the same way. An electrolytic solution is added to the resultant to obtain a cell for testing.

(4) Electrolytic Solution:

In a mixed solution of 8 parts by mass of ethylene carbonate (EC) and 12 parts by mass of diethyl carbonate (DEC), 1 mol/liter of $LiPF_6$ is dissolved as an electrolyte.

(5) Measurement Test of a High-Rate Discharge Capacity Keeping Ratio

A constant-current and low-voltage discharge test is performed at a current density of 0.2 mA/cm$^2$ (corresponding to 0.1 C), 10 mA/cm$^2$ (corresponding to 5 C) and 20 mA/cm$^2$ (corresponding to 10 C). The test is performed in a thermostat bath set at 25° C.

Regarding charging (insertion of lithium into carbon), constant current (CC) charging is performed at 0.2 mA/cm$^2$ from a rest potential to 0.002 V. Next, the charging is switched to constant voltage (CV) charging at 0.002 V and stopped when a current value drops to 25.4 µA.

Regarding discharging (release from carbon), CC discharging is performed at a predetermined current density and cut off at a voltage of 1.5 V.

(6) Measurement Test of a High-Rate Charge/Discharge Cycle Capacity Keeping Ratio A constant-current and low-voltage charge/discharge test is performed at a current density of 2 mA/cm$^2$ (corresponding to 1 C).

Regarding charging (insertion of lithium into carbon), constant current (CC) charging is performed at 0.2 mA/cm$^2$ from a rest potential to 0.002 V. Next, the charging is switched to constant voltage (CV) charging at 0.002 V and stopped when a current value drops to 25.4 µA.

Regarding discharging (discharge from carbon), CC discharging is performed at a predetermined current density and cut off at a voltage of 1.5V. Further, the measurement is performed in a thermostat bath set at 60° C., and charge/discharge is repeated 200 cycles.

(7) Measurement of Electrode Density and Volume Energy Density

NMP is added to the main undiluted solution and the viscosity thereof is adjusted. After that, the resultant solution is applied to a high-purity copper foil to a thickness of 160 µm using a doctor blade. The high-purity copper foil thus obtained is dried in vacuum at 120° C. for 1 hour and punched into a size of 22 mmΦ. The electrode thus punched out is sandwiched between pressing plates made of super-steel and pressed so that a press pressure becomes about $1\times10^2$ to $3\times10^2$ N/mm$^2$ ($1\times10^3$ to $3\times10^3$ kg/cm$^2$) with respect to the electrode. Then, the electrode thickness is measured using a thicknessmeter (SMD-565, produced by TECLOCK). Then, the mass of an active material is divided by the volume (=active material thickness×380 mm$^2$) of the electrode to obtain electrode density (g/cm$^3$). Further, the discharge capacity (0.1 C) is multiplied by electrode density to obtain volume energy density.

[Preparation of a Carbon Material]

(1) Graphite Material A

A residue obtained by distilling Venezuelan crude oil under reduced pressure is used as a material. The properties of the material are as follows: specific gravity: 3.4° API, Asphaltene component: 21% by mass, resin component: 11% by mass, and sulfur component: 3.3% by mass. This material is injected into a delayed coking process. At this time, the process is performed at a heating furnace heater output temperature of 570° C. before a coke drum. The internal pressure is set to be about 138 kPa (20 psig). Then, the coke is granulated to a particle diameter of about 3 to 8 mm unlike the ordinary process. The coke thus obtained is cooled with water and discharged from the coke drum. The coke is heated at 120° C. and dried to a moisture-containing ratio of 0.5% by mass or less. At this time, the reduced amount by heating in an argon atmosphere from 300° C. to 1,200° C. is 11.8% by mass. The dried coke is crushed with a bantam mill produced by Hosokawa Micron Corporation. Next, the crushed coke is subjected to air-flow screening with Turboclassifier TC-15N produced by Nisshin Engineering Inc. to obtain a carbon material, wherein D50 is 13.5 µm, substantially containing no particles each having a particle diameter of 0.5 µm or less. The crushed carbon material is placed in a graphite crucible with a screwcap and heated at 3,100° C. in an Acheson furnace to obtain a graphite material. FIG. 1 shows a polarizing microscope image photograph.

This obtained material was measured for various physical properties. Table 3-1 shows the results.

(2) Graphite material B

A residue obtained by distilling Mexican crude oil under normal pressure is used as a material. The components of the material are as follows: specific gravity: 0.7° API, Asphaltene component: 15% by mass, resin component: 14% by mass, and sulfur component: 5.3% by mass. This material is injected into a delayed coking process.

At this time, the process is performed at a heating furnace heater output temperature of 560° C. before a coke drum and the drum internal pressure is set to be about 207 kPa (30 psig). Then, the coke is granulated to a particle diameter of about 3 to 8 mm unlike the ordinary process. The coke thus obtained is cooled with water and discharged from the coke drum. The resultant coke is heated at 120° C. and dried to a moisture-containing ratio of 0.5% by mass or less. At this time, the reduced amount by heating in an argon atmosphere from 300° C. to 1,200° C. is 13.1% by mass. The dried coke is crushed with a bantam mill produced by Hosokawa Micron Corporation. Next, the crushed coke is subjected to air-flow screening with Turboclassifier TC-15N produced by Nisshin Engineering Inc. to obtain a carbon material, wherein D50 is 18.5 µm, substantially containing no particles each having a particle diameter of 0.5 µm or less. The crushed carbon material is placed in a graphite crucible with a screwcap and heated at 3,100° C. in an Acheson furnace to obtain a graphite material.

This obtained material was measured for various physical properties. Table 3-1 shows the results.

(3) Graphite material C

Figure 2:
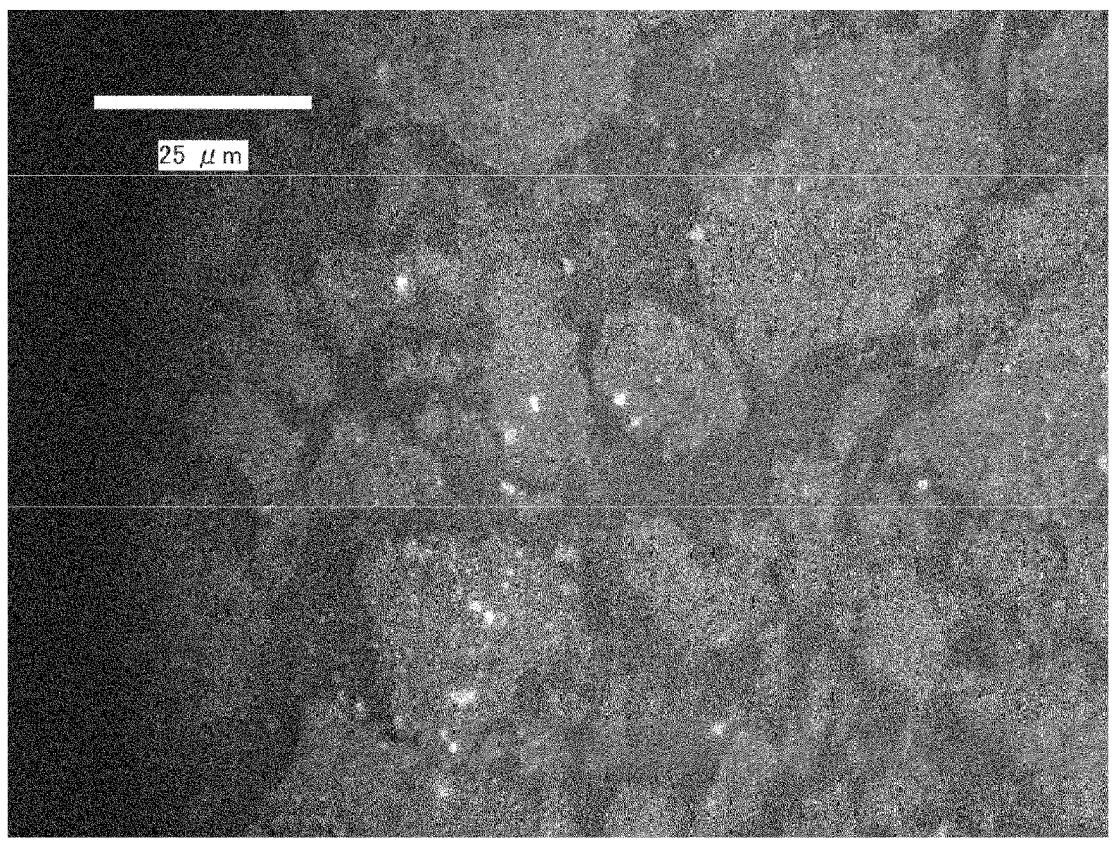
FIG. 2 A polarizing microscope image of graphite material C

A residue obtained by distilling Californian crude oil under reduced pressure is used as a material. The properties of the material are as follows: specific gravity: 3.0° API, Asphaltene component: 28% by mass, resin component: 11% by mass, and sulfur component: 3.5% by mass. This material is injected into a delayed coking process. At this time, the process is performed at a heating furnace heater output temperature of 570° C. before a coke drum. The internal pressure is set to be about 214 kPa (31 psig). Then, the coke is granulated to a particle diameter of about 3 to 8 mm unlike the ordinary process. The coke thus obtained is cooled with water and discharged from the coke drum. The coke is heated at 120° C. and dried to a moisture-containing ratio of 0.5% by mass or less. At this time, the reduced amount by heating in an argon atmosphere from 300° C. to 1,200° C. is 12.8% by mass. The dried coke is crushed with a bantam mill produced by Hosokawa Micron Corporation. Next, the crushed coke is subjected to air-flow screening with Turboclassifier TC-15N produced by Nisshin Engineering Inc. to obtain a carbon material, wherein D50 is 15.1 µm, substantially containing no particles each having a particle diameter of 0.5 µm or less. The crushed carbon material is placed in a graphite crucible with a screwcap and heated at 3,100° C. in an Acheson furnace to obtain a graphite material. FIG. 2 shows a polarizing microscope image photograph.

The resultant material was measured for various physical properties. Table 3-1 shows the results.

(4) Carbon Material D

A phenol resin ("Bellpearl C-800" produced by Kanebo Co. Ltd.) is pre-cured at 170° C. for 3 minutes and then cured at 130° C. for 8 hours. Next, the temperature is raised to 1,200° C. at a rate of 250° C./h in a nitrogen atmosphere, and kept at 1,200° C. for 1 hour. After that, the phenol resin is cooled to obtain phenol resin sintered charcoal. The phenol resin sintered charcoal thus obtained was measured for various physical properties. Table 3-2 shows the results.

(5) Graphite Material E

Figure 3:
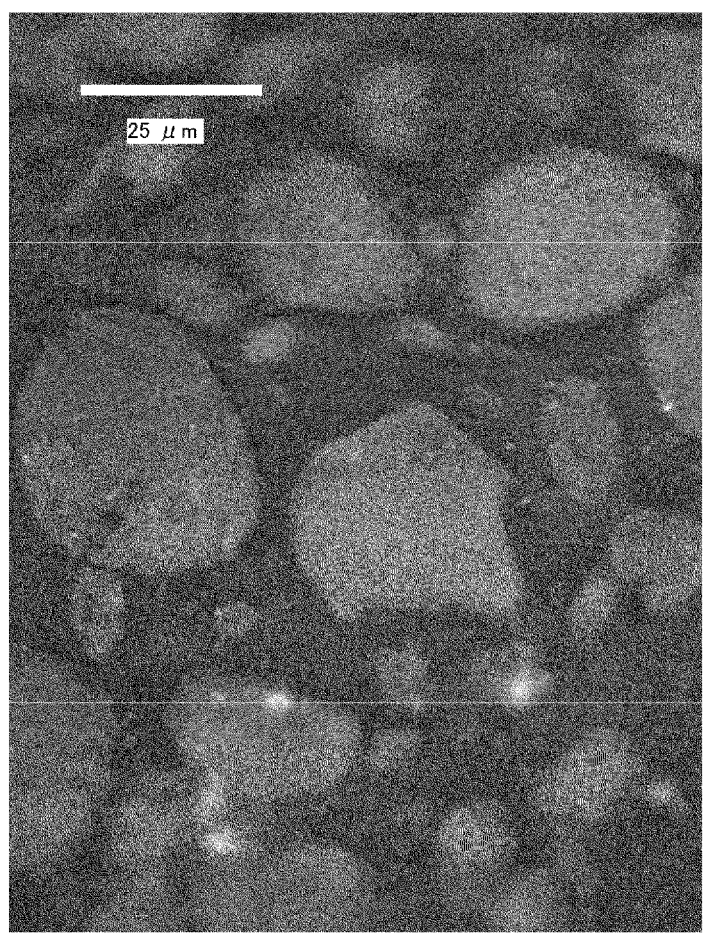
FIG. 3 A polarizing microscope image of graphite material E

MCMB2528 (graphitization temperature: 2,800° C.) produced by Osaka Gas Co., Ltd. was purchased and measured for various physical properties. Table 3-2 shows the results. FIG. 3 shows a polarizing microscope image photograph.

(6) Graphite Material F

A residue obtained by distilling Arabian crude oil under reduced pressure is used as a material. The properties of the material are as follows: specific gravity: 3.4° API, Asphaltene component: 7% by mass, resin component: 7% by mass, and sulfur component: 6.3% by mass. This material is injected into a delayed coking process. At this time, the process is performed at a heating furnace heater output temperature of 570° C. before a coke drum. Then, the coke becomes lump. The coke is cut out with water jet and then cooled and discharged from the coke drum. The coke is heated at 120° C. and dried to a moisture-containing ratio of 0.5% by mass or less. At this time, the reduced amount by heating in an argon atmosphere from 300° C. to 1,200° C. is 11.8% by mass. The dried coke is crushed with a bantammill produced by Hosokawa Micron Corporation. Next, the crushed coke is subjected to air-flow screening with Turboclassifier TC-15N produced by Nisshin Engineering Inc. to obtain a carbon material having D50 of 13.1 μm. The crushed carbon material is placed in a graphite crucible with a screwcap and heated at 3,100° C. in an Acheson furnace to obtain a graphite material. The resultant material was measured for various physical properties. Table 3-2 shows the results.

Figure 4:
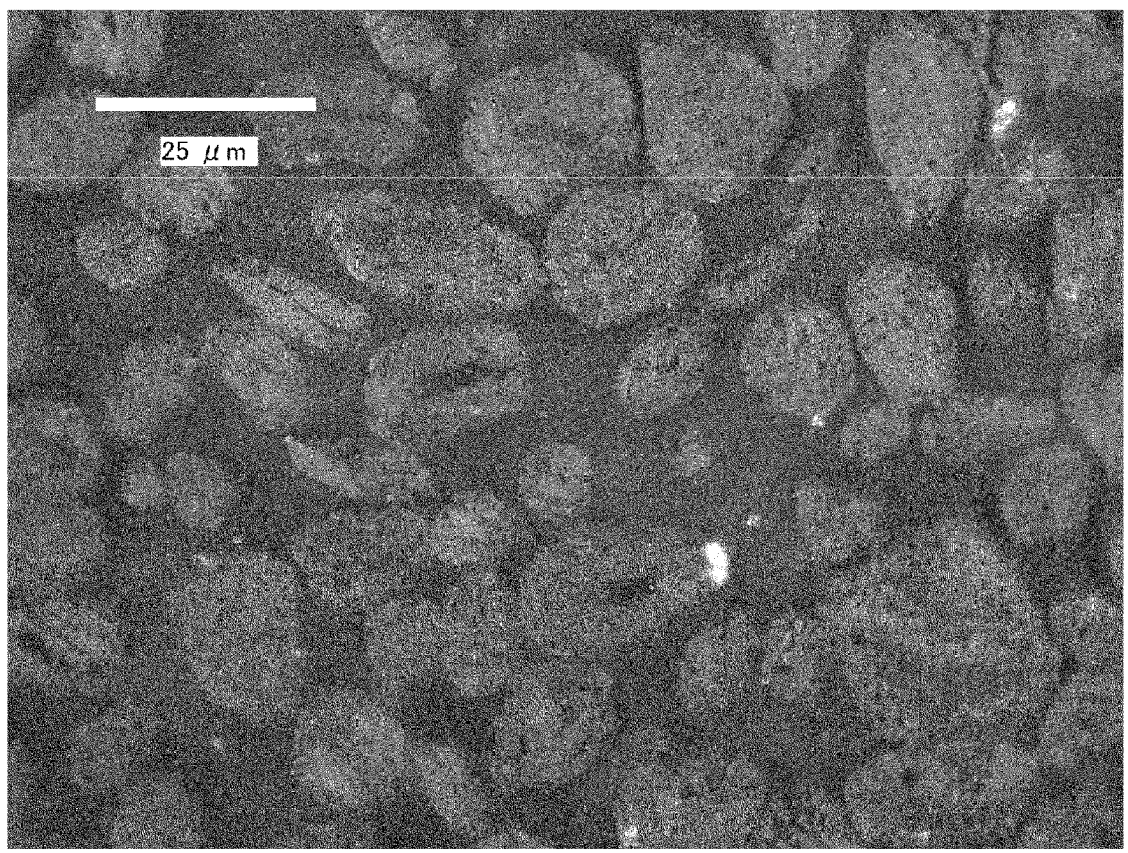
FIG. 4 polarizing microscope image of graphite material G

(7) Graphite Material G 600 g of Chinese natural graphite with an average particle diameter of 7 μm are placed in Hybridizer NHS1 produced by Nara Machinery Co., Ltd., and treated at a rotor circumferential velocity of 60/m/sec. for 3 minutes to obtain spherical particles with an average particle diameter of 15 μm. This operation is performed several times, and 3 kg of the obtained carbon material and 1 kg of oil-based tar are placed in an M20-type Loedige Mixer (inner capacity: 20 liters) produced by Matsubo Corporation, followed by kneading. Then, the temperature is raised to 700° C. in a nitrogen atmosphere, and tar is removed. Then, the temperature is raised to 1,300° C., and heat treatment is performed. The heat-treated product thus obtained is shredded with a pin mill, and subjected to screening for the purpose of removing coarse particles to prepare a carbon material with a multilayer structure for an electrode. The material thus obtained was measured for various physical properties. Table 3-2 shows the results. FIG. 4 shows a polarizing microscope image photograph.

(8) Carbon Material on the Way to a Graphitized Structure

The needle coke for artificial graphite electrodes (calcination temperature: 1300° C.) was used as a raw material. The coke having physical properties such that the coefficient of thermal expansion (CTE) after to be graphitized at 2,800° C. becomes $4.6 \times 10^{-7}$/° C. The calcined coke was pulverized using a bantam mill produced by Hosokawa Micron Corporation prior to heating. Next, the coke was subjected to air classification using Turbo Classifier TC-15N produced by Nisshin Engineering Inc. to obtain a carbon material in which D50=13.5 μm and particles having a diameter of 0.5 μm or less are not substantially contained. The pulverized carbon materials was filled in a graphite crucible with a screw-top lid and subjected to heat treatment in Atchison furnace at 2000° C. to obtain a carbon material on the way to a graphitized structure. The ratio of peak intensity IA assigned to the (101) plane to peak intensity ratio IB assigned to the (100) plane (IA/IB) by X-ray powder diffraction of the obtained carbon material was 0.4.

Example 1

100 parts by mass of graphite material A and 100 parts by mass of the carbon material on the way to a graphitized structure were mixed by a Spartan granulator for five minutes. An electrode was made using the obtained material and measured for cycle characteristics and the like. The results are shown in Table 4.

Example 2

100 parts by mass of graphite material A and 200 parts by mass of the carbon material on the way to a graphitized structure were mixed by a Spartan granulator for five minutes. An electrode was made using the obtained material and measured for cycle characteristics and the like. The results are shown in Table 4.

Example 3

200 parts by mass of graphite material A and 100 parts by mass of the carbon material on the way to a graphitized structure were mixed by a Spartan granulator five minutes. An electrode was made using the obtained material and measured for cycle characteristics and the like. The results are shown in Table 4.

Example 4

500 parts by mass of graphite material A and 100 parts by mass of the carbon material on the way to a graphitized structure were mixed by a Spartan granulator for five minutes. An electrode was made using the obtained material and measured for cycle characteristics and the like. The results are shown in Table 4.

Example 5

100 parts by mass of graphite material A and 500 parts by mass of the carbon material on the way to a graphitized structure were mixed by a Spartan granulator for five minutes. An electrode was made using the obtained material and measured for cycle characteristics and the like. The results are shown in Table 4.

Example 6

100 parts by mass of graphite material B and 100 parts by mass of the carbon material on the way to a graphitized structure were mixed by a Spartan granulator for five minutes. An electrode was made using the obtained material and measured for cycle characteristics and the like. The results are shown in Table 4.

Example 7

500 parts by mass of graphite material B and 100 parts by mass of the carbon material on the way to a graphitized structure were mixed by a Spartan granulator for five minutes. An electrode was made using the obtained material and measured for cycle characteristics and the like. The results are shown in Table 4.

Example 8

100 parts by mass of graphite material C and 100 parts by mass of the carbon material on the way to a graphitized structure were mixed by a Spartan granulator for five minutes. An electrode was made using the obtained material and measured for cycle characteristics and the like. The results are shown in Table 4.

Example 9

500 parts by mass of graphite material C and 100 parts by mass of the carbon material on the way to a graphitized structure were mixed by a Spartan granulator for five minutes. An electrode was made using the obtained material and measured for cycle characteristics and the like. The results are shown in Table 4.

Example 10

100 parts by mass of graphite material C and 500 parts by mass of the carbon material on the way to a graphitized structure were mixed by a Spartan granulator for five minutes. An electrode was made using the obtained material and measured for cycle characteristics and the like. The results are shown in Table 4.

Comparative Examples 1 to 4

An electrode was made using carbon material D and graphite materials E, F and G respectively as Comparative Examples 1 to 4 and measured for cycle characteristics and the like. The results are shown in Table 4.

TABLE 3-1

| Item | Unit | Graphite material A | Graphite material B | Graphite material C |
|---|---|---|---|---|
| Optical anistoropic structure area ratio | % | 92 | 94 | 91 |
| Optical isotropic structure area ratio | % | 5.3 | 4.9 | 8 |
| Void area ratio | % | 2.7 | 1.1 | 1 |
| Da(30) | μm$^2$ | 9 | 7 | 6 |
| Da(10) | μm$^2$ | 3.17 | 2.1 | 1.87 |
| Da(50) | μm$^2$ | 32 | 24.5 | 23.6 |
| Da(90) | μm$^2$ | 189 | 221 | 258 |
| Db(99.5)/Da(100) | % | 79.7 | 85.2 | 80.2 |
| Dc(10) | μm$^2$ | 0.85 | 1.1 | 0.93 |
| Dc(50) | μm$^2$ | 2.76 | 6.2 | 5.44 |
| Dc(90) | μm$^2$ | 19.9 | 25.6 | 23.4 |
| Ratio of Cmin | % | 31 | 12 | 22 |
| Lmax/Lave |  | 0.35 | 0.21 | 0.25 |
| Maximum heat treatment temperature | °C. | 3,150 | 3,100 | 3,150 |
| Average interplanar spacing (d002) by x-ray diffraction method | nm | 0.3362 | 0.3358 | 0.3369 |
| Lc | nm | 72 | 92 | 85 |
| Average interplanar spacing (d002) by TEM | nm | 0.3356 | 0.3355 | 0.3359 |
| Aspect ratio |  | 1.11 | 1.30 | 1.25 |
| Average particle diameter |  |  |  |  |
| D0 | μm | 0.6 | 1.1 | 4.1 |
| D50 | μm | 13.5 | 18.5 | 15.1 |
| Specific surface area | m$^2$/g | 1.1 | 1.3 | 1.0 |
| Tap density (0 times) | g/cm$^3$ | 0.9 | 0.81 | 0.77 |
| Tap density (400 times) | g/cm$^3$ | 1.32 | 1.26 | 1.23 |

TABLE 3-2

| Item | Unit | Carbon material D | Graphite material E | Graphite material F | Graphite material G |
|---|---|---|---|---|---|
| Optical anistoropic structure area ratio | % | 10 | 98 | 98 | 70 |
| Optical isotropic structure area ratio | % | 79 | 1.9 | 0.5 | 23 |
| Void area ratio | % | 11 | 0.1 | 1.5 | 7 |
| Da(30) | μm$^2$ | 7 | 54 | 15 | 13 |
| Da(10) | μm$^2$ | 2.2 | 8.28 | 2.52 | 2.11 |
| Da(50) | μm$^2$ | 5 | 177 | 40.6 | 4.28 |
| Da(90) | μm$^2$ | 22 | 370 | 213 | 156 |
| Db(99.5)/Da(100) | % | 28 | 40.5 | 71.3 | 72.4 |
| Dc(10) | μm$^2$ | 3.1 | 1.22 | 1.99 | 0.98 |
| Dc(50) | μm$^2$ | 21 | 8.49 | 11.6 | 6.78 |
| Dc(90) | μm$^2$ | 62 | 26.6 | 47.2 | 24.9 |
| Ratio of Cmin | % | 1.1 | 10 | 9 | 5 |
| Lmax/Lave |  | 0.24 | 0.88 | 0.39 | 0.79 |
| Maximum heat treatment temperature | °C. | 1,300 | 2,800 | 3,100 | 1,300 |
| Average interplanar spacing (d002) by x-ray diffraction method | Nm | 0.357 | 0.3363 | 0.3361 | 0.3357 |

TABLE 3-2-continued

| Item | Unit | Carbon material D | Graphite material E | Graphite material F | Graphite material G |
|---|---|---|---|---|---|
| Lc | Nm | 22 | 95 | 120 | 250 |
| Average interplanar spacing (d002) by TEM | Nm | Unmeasurable | 0.336 | 0.3359 | 0.3355 |
| Aspect ratio | | 1.24 | 1.12 | 1.35 | 1.18 |
| Average particle diameter | | | | | |
| D0 | μm | 1.8 | 9 | 3 | 9 |
| D50 | μm | 20 | 20 | 15 | 20 |
| Specific surface area | m$^2$/g | 12 | 0.9 | 5.5 | 5.1 |
| Tap density (0 times) | g/cm$^3$ | 0.9 | 1.2 | 0.45 | 0.88 |
| Tap density (400 times) | g/cm$^3$ | 1.1 | 1.37 | 0.88 | 1.05 |
| Surface coating | | None | None | None | Existent |

TABLE 4

| | Graphite material | Graphite material:Graphite material on the way to a graphitized structure (ratio by mass) | Discharge capacity (mAh/g) | | | 0.1 C→10 C Capacity retention ratio (%) | 0.1 C→5 C Capacity retention ratio (%) | Cycle capacity retention after 200 cycles at 1 C discharge and 60° C. (%) |
|---|---|---|---|---|---|---|---|---|
| | | | 0.1 C | 10 C | 5 C | | | |
| Example 1 | A | 1:1 | 290 | 245 | 281 | 84 | 97 | 92 |
| Example 2 | A | 1:2 | 303 | 243 | 291 | 80 | 96 | 90 |
| Example 3 | A | 1:1 | 277 | 247 | 270 | 89 | 97 | 93 |
| Example 4 | A | 5:1 | 317 | 242 | 301 | 76 | 95 | 89 |
| Example 5 | A | 1:5 | 263 | 248 | 260 | 94 | 99 | 96 |
| Example 6 | B | 1:1 | 295 | 249 | 285 | 84 | 97 | 92 |
| Example 7 | B | 5:1 | 309 | 249 | 297 | 81 | 96 | 87 |
| Example 8 | C | 1:1 | 280 | 249 | 273 | 89 | 98 | 93 |
| Example 9 | C | 5:1 | 324 | 248 | 308 | 77 | 95 | 86 |
| Example 10 | C | 1:5 | 265 | 250 | 262 | 94 | 99 | 96 |
| Comparative Example 1 | Carbon material D | | 272 | 238 | 252 | 88 | 93 | 89 |
| Comparative Example 2 | Graphite material E | | 336 | 201 | 268 | 60 | 80 | 65 |
| Comparative Example 3 | Graphite material F | | 341 | 170 | 204 | 50 | 60 | 62 |
| Comparative Example 4 | Graphite material G | | 368 | 121 | 165 | 33 | 45 | 75 |

INDUSTRIAL APPLICABILITY

According to the present invention, by forming a graphite material having diversity in the sizes of optical anisotropic structure and optical isotropic structure, the ratio thereof, and crystal direction, it is possible to obtain a negative electrode material for a lithium ion secondary battery capable of maintaining the large current load characteristics and the cycle characteristics at a high level as the additive for the lithium ion secondary battery while having the large discharge capacity and the small irreversible capacity. By mixing the negative electrode material with a conventional easily-graphitizable carbon material on the way to a graphitized structure, it has become possible to provide a negative electrode material which meets the needs regarding large current-input/output characteristics at various levels. Further, the method of producing the graphite material of the present invention is excellent in economic efficiency and mass productivity, and exhibits excellent performance for the large lithium ion secondary battery to be expected in the future.

The battery or secondary battery of the present invention can be applied to the fields in which the conventional lead secondary battery, nickel-cadmium secondary battery, and nickel metal hydride secondary battery have been mainly used, for example, a motor-driven tool such as a motor-driven drill, a hybrid electric vehicle (HEV), and an electric vehicle (EV).

The invention claimed is:

1. A graphite carbon composite material obtained by mixing a graphite material comprising graphite particles each formed of an optical anisotropic structure, an optical isotropic structure and voids and satisfying the following conditions (1) and (2):

(1) when ten square regions with a side of 100 μm are randomly selected from a cross-section of a molding made of the graphite material, in cross-sections of the graphite particles appearing in the regions, a total area (x) of the optical anisotropic structure, a total area (y) of the optical isotropic structure, and a total area (z) of the voids satisfy the following relationship:

$x{:}y{:}z = 50\text{-}97{:}3\text{-}50{:}0\text{-}10$, and $x+y+z=100$ (2) in cross-sections of the randomly selected 100 particles, a maximum value of a length of a long-side portion of optical anisotropic structure domains is defined as $L_{max}$ and an average particle diameter (D50) based on a volume measured by laser diffraction method is defined as $L_{ave}$, $L_{max}/L_{ave} \leq 0.5$;

and a carbon material on the way to a graphitized structure of easily-graphitizable carbon.

2. The graphite carbon composite material according to claim 1, in which, when ten square regions with a side of 100 μm are randomly selected from the cross-section of the molding made of the graphite material, cross-sections of the graphite particles appearing in the regions satisfy the following condition with respect to the graphite material:

$$0.75 \leq Db(99.5)/Da(100) \leq 0.995$$

(in the above-mentioned expression: Da(n1) represents an area value (μm$^2$) of a maximum domain when areas of the optical anisotropic structure domains are integrated in an ascending order and a total of the integrated values reaches n1% of a total (A) of areas (μm$^2$) of the optical anisotropic structure domains, and Db(n2) represents an area value (μm$^2$) of a maximum domain when the optical anisotropic structure domains are arranged in an ascending order of areas, and a total of the number reaches n2% of a total (B) of the number of the optical anisotropic structure domains).

3. The graphite carbon composite material according to claim 1, in which, in a polarizing microscope image of a sensitized color test plate in a cross-Nicols state which passed on along the cross-sections of the graphite particles appearing in the regions, when ten square regions with a side of 100 μm are randomly selected from the cross-section of the molding made of the graphite material, an area total value $C_{min}$ of smallest total values of areas of respective colors: magenta, blue, and yellow which are interference colors showing a direction of a graphite network of the optical anisotropic structure domains is 12 to 32% to a total cross-sectional area of the graphite particles with respect to the graphite material.

4. The graphite carbon composite material according to claim 1, in which, when ten square regions with a side of 100 μm are randomly selected from the cross-section of the molding made of the graphite material, the cross-sections of the graphite particles appearing in the regions satisfy the following condition with respect to the graphite material:

$$0.6\ \mu m^2 \leq Da(30) \leq 10\ \mu m^2$$

(in the above-mentioned expression, Da(n1) represents the same as that in claim 2).

5. The graphite carbon composite material according to claim 1, in which, when ten square regions with a side of 100 μm are randomly selected from the cross-section of the molding made of the graphite material, the cross-sections of the graphite particles appearing in the regions satisfy the following conditions (1) to (3) with respect to the graphite material:

$$0.5\ \mu m^2 \leq Da(10) \leq 5\ \mu m^2 \quad (1)$$

$$0.6\ \mu m^2 \leq Da(50) \leq 50\ \mu m^2 \quad (2)$$

$$0.7\ \mu m^2 \leq Da(90) \leq 400\ \mu m^2 \quad (3)$$

(in the above-mentioned expressions, Da(n1) represents the same as that in claim 2).

6. The graphite carbon composite material according to claim 1, in which the surfaces of the graphite particles constituting the graphite material are coated with another carbon material.

7. The graphite carbon composite material according to claim 6, in which a part of a carbon fiber with a fiber diameter of 2 to 1,000 nm is bonded to the surface of the graphite particle.

8. The graphite carbon composite material according to claim 1, in which the carbon material on the way to a graphitized structure is obtained by subjecting easily-graphitizable carbon to heat treatment at 1,700 to 2,300° C.

9. The graphite carbon composite material according to claim 8, in which the easily-graphitizable carbon is any one of petroleum-based coke, coal-based coke and mesocarbon microbeads.

10. The graphite carbon composite material according to claim 1, wherein the carbon material on the way to a graphitized structure is a material satisfying the condition of 0.1<IA/IB<0.9 in which IA and IB is the peak intensity assigned to (101) plane and (100) plane, respectively, by the X-ray powder diffraction method.

11. The graphite carbon composite material according to claim 1, in which the graphite material content is 10 parts by mass or more and 1000 parts by mass or less to 100 parts by mass of the content of the carbon material on the way to a graphitized structure.

12. A carbon material for a battery electrode, comprising the graphite carbon composite material according to claim 1.

13. A paste for an electrode, comprising the carbon material for a battery electrode according to claim 12 and a binder.

14. An electrode, comprising a molding of the paste for an electrode according to claim 13.

15. A battery, comprising the electrode according to claim 14 as a constituent element.

16. A lithium ion secondary battery, comprising the electrode according to claim 14 as a constituent element.

17. A method of producing the graphite carbon composite material according to claim 1, wherein the method of producing the graphite material comprises subjecting a crude oil distilled residue, in which a total composition of an Asphaltene component and a resin component is 30% by mass to 80% by mass and a sulfur part is 0.3% by mass to 6% by mass, to delayed-coking with a heating furnace heater output temperature before a coke drum controlled to be 550° C. to 580° C., crushing the obtained carbon material, and performing graphitizing treatment on the crushed carbon material at a temperature of 2,000 to 3,300° C.

18. The method of producing the graphite carbon composite material according to claim 17, in which a temperature for the graphitizing treatment is 2,500° C. to 3,300° C.

* * * * *